(12) United States Patent
Tung

(10) Patent No.: US 8,523,210 B1
(45) Date of Patent: Sep. 3, 2013

(54) COMBINATION BUDDY BICYCLE

(76) Inventor: Tiling Tung, New Taipei (TW)

(*) Notice: Subject to any disclaimer, the term of this patent is extended or adjusted under 35 U.S.C. 154(b) by 20 days.

(21) Appl. No.: 13/462,891

(22) Filed: May 3, 2012

(51) Int. Cl.
  *B62K 13/06* (2006.01)
(52) U.S. Cl.
  USPC ............................ 280/231; 280/230; 280/209
(58) Field of Classification Search
  USPC ................................ 280/281.1, 209, 231, 230
  See application file for complete search history.

(56) References Cited

U.S. PATENT DOCUMENTS

| | | | | |
|---|---|---|---|---|
| 3,664,684 A | * | 5/1972 | Long ................................ 80/231 |
| D289,271 S | * | 4/1987 | Hendrickson et al. ....... D12/112 |
| 5,511,809 A | * | 4/1996 | Sagi .............................. 280/209 |
| 6,022,036 A | * | 2/2000 | Chartrand ..................... 280/209 |
| 6,247,714 B1 | * | 6/2001 | Rasmussen et al. .......... 280/231 |
| 6,926,296 B1 | * | 8/2005 | Harrington .................... 280/209 |
| D590,747 S | * | 4/2009 | Staller .......................... D12/107 |
| D592,558 S | * | 5/2009 | Staller ........................... D12/112 |
| 8,162,339 B2 | * | 4/2012 | James ............................ 280/231 |

* cited by examiner

*Primary Examiner* — Kevin Hurley
*Assistant Examiner* — Michael Stabley
(74) *Attorney, Agent, or Firm* — Jackson IPG PLLC

(57) ABSTRACT

A combination buddy bicycle includes a front bike frame, two transverse frames, two front wheel brackets, two steering control bar, front and rear transmission shafts, $1^{st}$–$4^{th}$ pedal assemblies, a middle bike frame, a rear wheel transmission shaft, a rear bike frame, two rear transverse frames, and two rear wheel brackets. The rear bike frame can be directly connected to the front bike frame after removal of the middle bike frame, enabling the bicycle to be ridden by two persons side by side. When the steering control bars are biased, the connected front wheel brackets and front wheels are synchronously biased, assuring high stability.

3 Claims, 29 Drawing Sheets

COMBINATION BUDDY BICYCLE

BACKGROUND OF THE INVENTION

1. Field of the Invention

The present invention relates to bicycles and more particularly, to a combination buddy bicycle that is designed to be ridden by one to four persons, and can be selectively arranged into a buddy bicycle for riding by two riders in a side-by-side manner, or collapsed to reduce storage space.

2. Description of the Related Art

Many four-seat buddy bicycle designs are known. Exemplars are seen in Taiwan Utility M290839, entitled "Four-wheel buddy bicycle"; Taiwan Utility M312479, entitled "Improved structure of four-wheel buddy bicycle"; Taiwan Utility M322908, entitled "Buddy bicycle steering structure". These buddy bicycles are designed to be ridden by multiple persons. However, these conventional designs still have drawbacks as follows:

1. These conventional buddy bicycles are commonly huge, heavy and not collapsible for convenient storage. To the manufacturers or distributors, these conventional designs do not facilitate packing or delivery.
2. These conventional buddy bicycles are based on a chain-transmission design. The transmission chain may fall from the chain wheels or break easily if only one of each two side-by-side riders is propelling the bicycle or there is a significant difference between the propelling forces from two side-by-side riders. When this problem occurred, it will be difficult to push the buddy bicycle back home or to the bicycle rental shop for repairmen.
3. When changing the steering direction, the two front wheels are biased synchronously subject to the linking effect of the linking rod between the two front forks of the front wheel unit. Subject to the linking effect of the linking rod, turning the buddy bicycle to a different direction is less stable.
4. The multiple frame components of the buddy bicycle are fixedly connected together by welding. The welding procedure requires much labor and time, and does not meet the principles of environmental protection.

Further, there are known tandem bicycles with fore-to-aft seating arrangement designed to be ridden by one to four persons, or even more than four persons. The term tandem refers to the seating arrangement. This fore-to-aft seating arrangement does not facilitate interaction, losing the fun of bike pool. Further, the more the number of riders of a tandem bicycle the higher the difficulty level will be.

Further, there are known face-to-face tandem bikes that allow two riders to ride the tandem face to face or back to back. However, a rider or person sitting on a tandem in the reversed direction, the rider may suffer from dizziness or motion sickness

SUMMARY OF THE INVENTION

The present invention has been accomplished under the circumstances in view. It is the main object of the present invention to provide a combination buddy bicycle, which is designed to be ridden by one to four persons, and allows removal of the middle bike frame for allowing connection of the rear bike frame to the front bike frame for riding two riders in a side-by-side manner, or collapsed to reduce storage space.

It is another object of the present invention to provide a combination buddy bicycle, which can be selectively arranged into different forms for riding by multiple riders in a side-by-side or fore-and-aft manner, widening the range of applications, enhancing its contribution to industrial value, and providing the advantages of convenience of use, selectivity and practicability.

It is still another object of the present invention to provide a combination buddy bicycle, which is collapsible, saving storage size and facilitating packing and delivery.

It is still another object of the present invention to provide a combination buddy bicycle, which eliminates chain transmission, avoiding loosen chain or broken chain repair work, achieving synchronous steering and high stability, and prolonging bicycle lifespan.

It is still another object of the present invention to provide a combination buddy bicycle, which has the characteristics of light weight and high mobility and less number of welded component parts, meeting the principles of environmental protection.

DETAILED DESCRIPTION OF THE INVENTION

Figure 1:
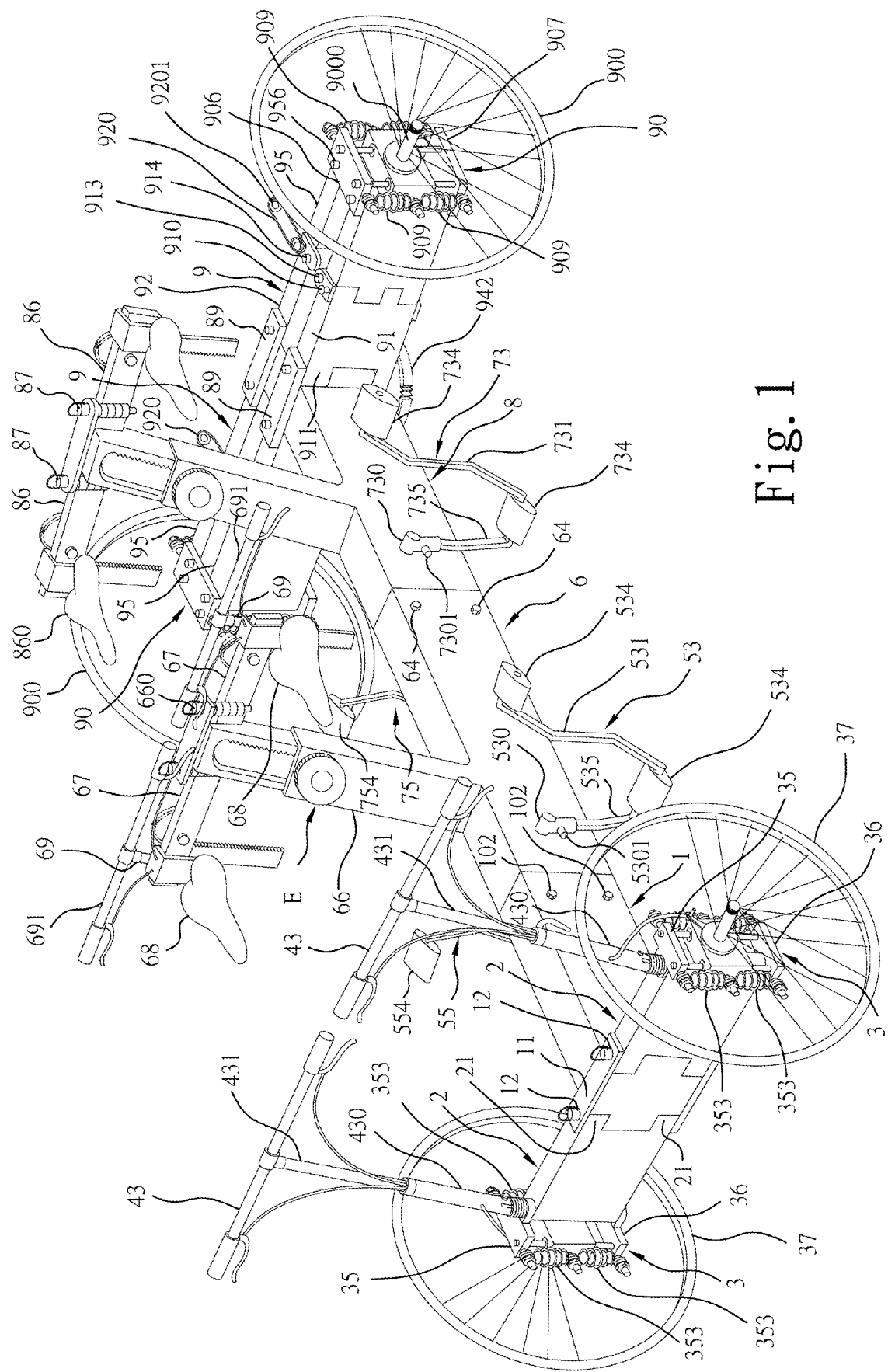
FIG. 1 is an elevational view of a combination buddy bicycle in accordance with the present invention.

Referring to FIGS. 1-31, a combination buddy bicycle in accordance with the present invention is shown comprising a front bike frame 1, two transverse frames 2, two front wheel brackets 3, two steering control bars 4, two head tubes 430, a front transmission shaft 51, a first driving wheel 52, a first pedal assembly 53, a second driving wheel 54, a second pedal assembly 55, a middle bike frame 6, a rear transmission shaft 71, a third driving wheel 72, a third pedal assembly 73, a fourth driving wheel 74, a fourth pedal assembly 75, a rear transmission shaft 70, a rear bike frame 8, two rear transverse frames 9, and two rear wheel brackets 90.

The front bike frame 1 (see FIG. 1, FIG. 5, FIG. 6, FIG. 7 and FIG. 11) comprises two connection portions 11 bilaterally disposed at a front end thereof, two locating bolts 12 respectively fastening the two connection portions 11 to respective inner ends of the two transverse frames 2 (see FIG. 6 and FIG. 7), each locating bolt 12 having a polygonal head 121 (see FIG. 7) positioned in a respective polygonal hole 111 in the associating connection portion 11 (see FIG. 6 and FIG. 7) and a cylindrical shank 122 downwardly inserted through the associating transverse frame 2, two inner longitudinal links 14 (see FIG. 6, FIG. 7, FIG. 8 and FIG. 11) each having a front end 140 respectively pivotally coupled to the cylindrical shanks 122 of the locating bolts 12 and a rear end 141, a middle transverse link 142 pivotally coupled between the rear ends 141 of the two inner longitudinal links 14 (see FIG. 6 and FIG. 11), two rear transverse links 15 respectively pivotally connected with respective inner ends thereof to the rear ends 141 of the two inner longitudinal links 14 (see FIG. 6 and FIG. 11), two sector gears 151 respectively fixedly located on the inner ends of the two rear transverse links 15 and meshed with each other, two outer longitudinal links 16 respectively pivotally coupled between respective outer ends of the two rear transverse links 15 and respective outer ends of the two transverse frames 2, and a mounting structure A (see FIG. 11) for selectively connecting the middle bike frame 6 (see FIG. 1) or rear bike frame 8 to the front bike frame 1. The mounting structure A comprises a coupling hole 10 (see FIG. 11) located on a rear end of the front bike frame 1 and adapted for receiving a front end of the middle bike frame 6 or rear bike frame 8, a plurality of mounting through holes 101 (see FIG. 5) transversely extending through the front bike frame 1 in communication with the coupling hole 10, and a plurality of screws 102 (see FIG. 1 and FIG. 5) respectively inserted through the mounting through holes 101 and the front end of the middle bike frame 6 or rear bike frame 8, and a plurality of nuts 103 respectively threaded onto the screws 102 to secure the front end of the middle bike frame 6 or rear bike frame 8 to the rear end of the front bike frame 1.

Figure 2:
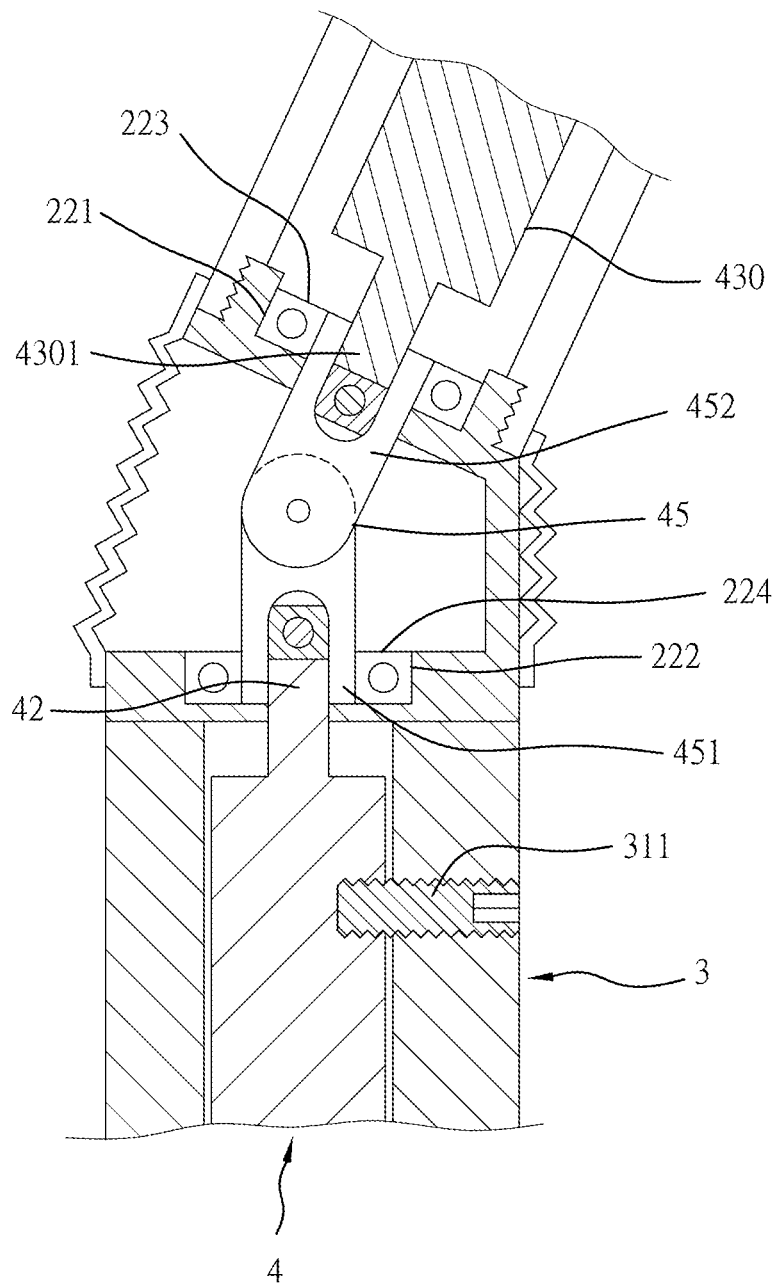
FIG. 2 is a schematic sectional view of a part of the present invention, illustrating the assembly of the front wheel bracket, the steering control bar, the transverse frame and the head tube.
Figure 11:
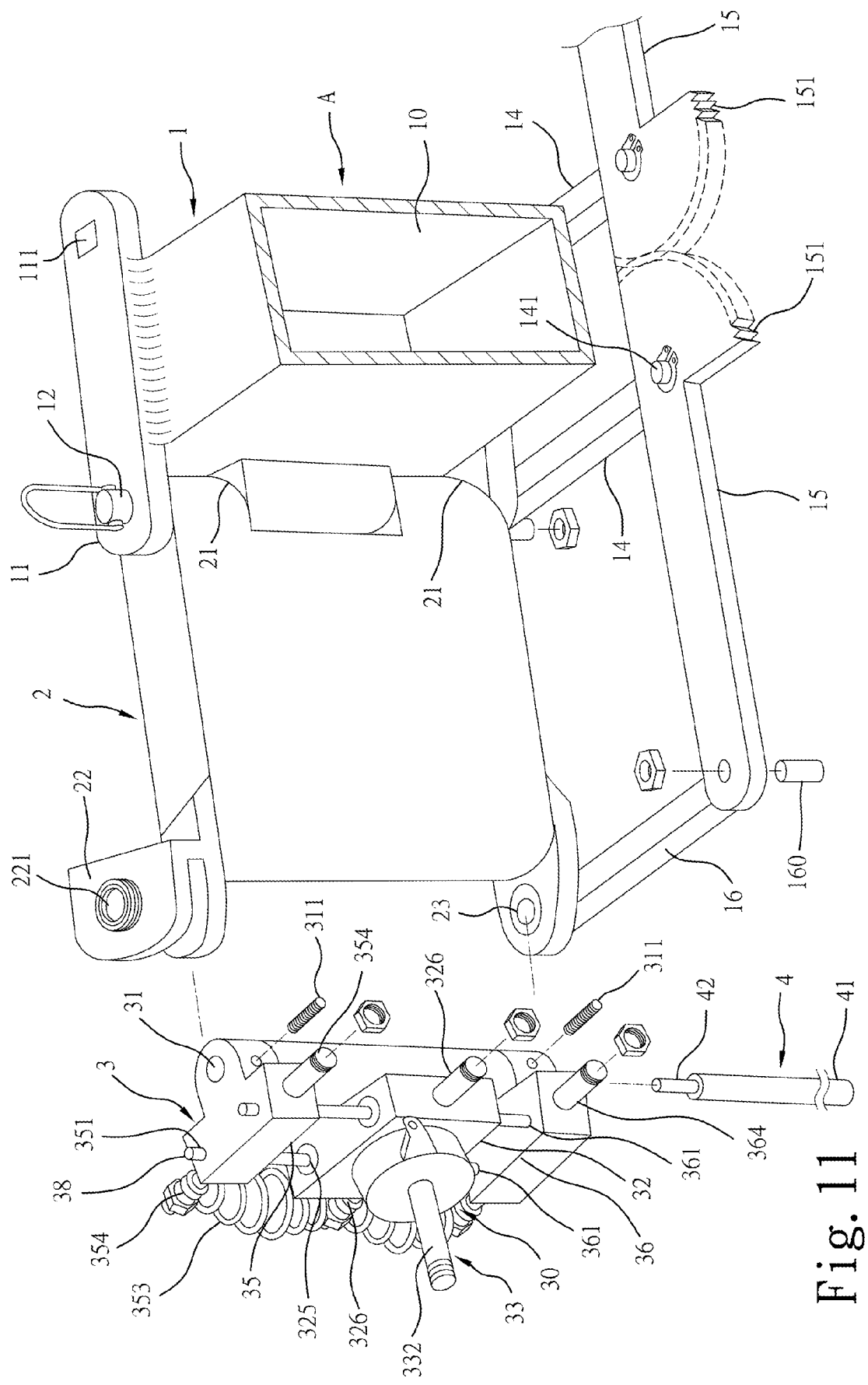
FIG. 11 is a schematic sectional elevation of a part of the present invention, illustrating the arrangement of the front bike frame with one transverse frame and one front wheel bracket.
Figure 12:
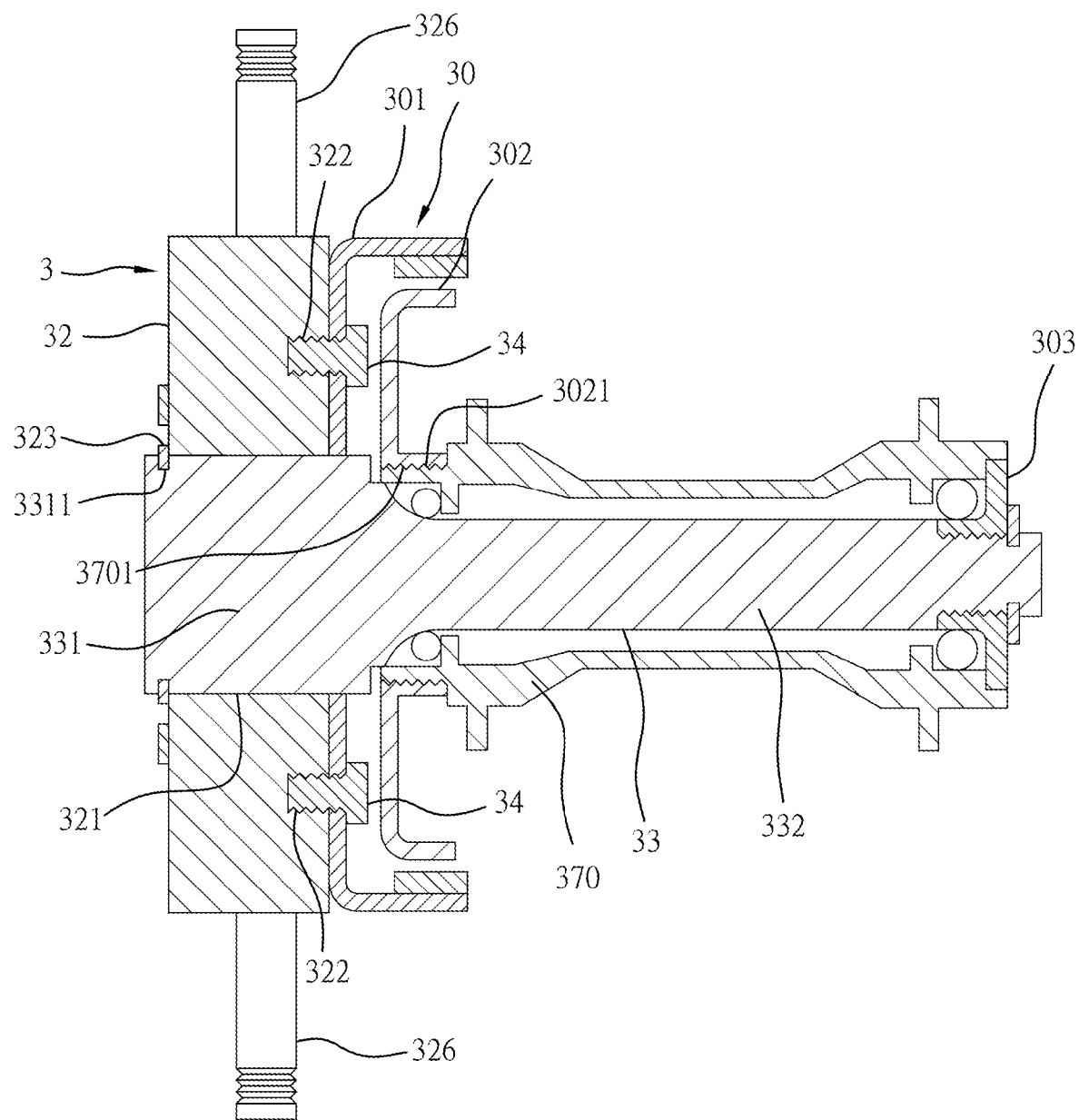
FIG. 12 is a schematic sectional elevation of a part of the present invention, illustrating the arrangement of the front wheel bracket and the associating front wheel axle.
Figure 13:
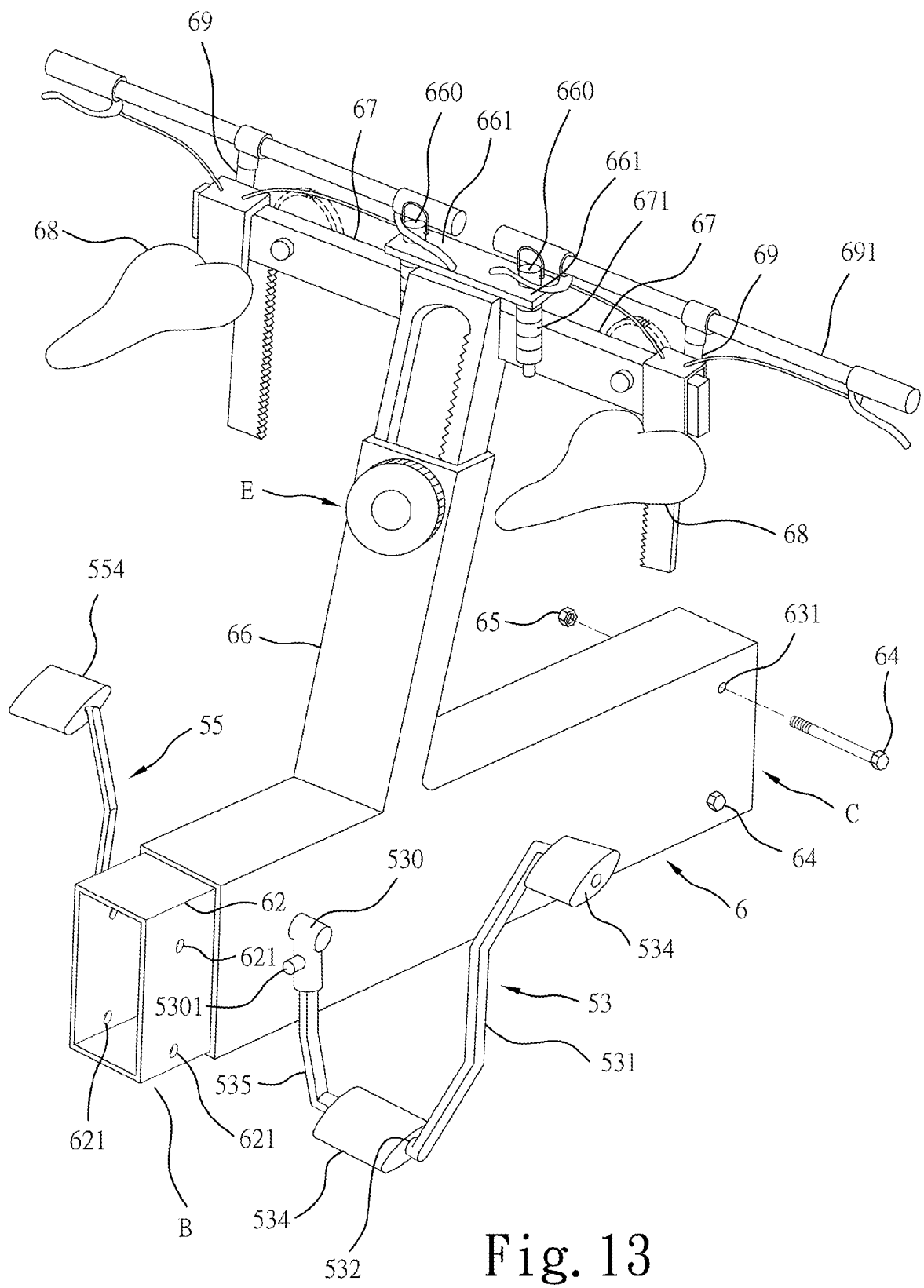
FIG. 13 is an elevational view of a part of the present invention, illustrating the arrangement of the middle bike frame with the related component parts.
Figure 14:
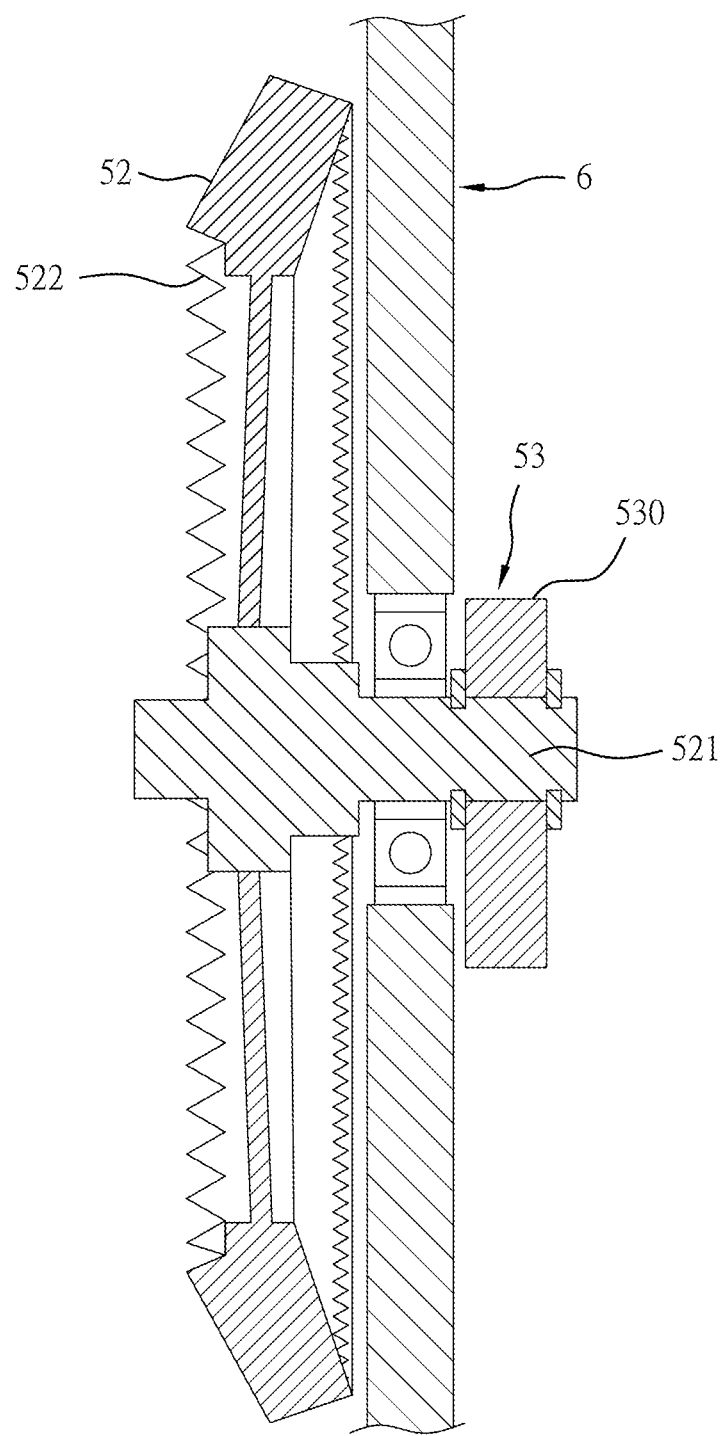
FIG. 14 is a schematic sectional view of a part of the present invention, illustrating the arrangement of the middle bike frame with the first driving wheel and the related connector.
Figure 15:
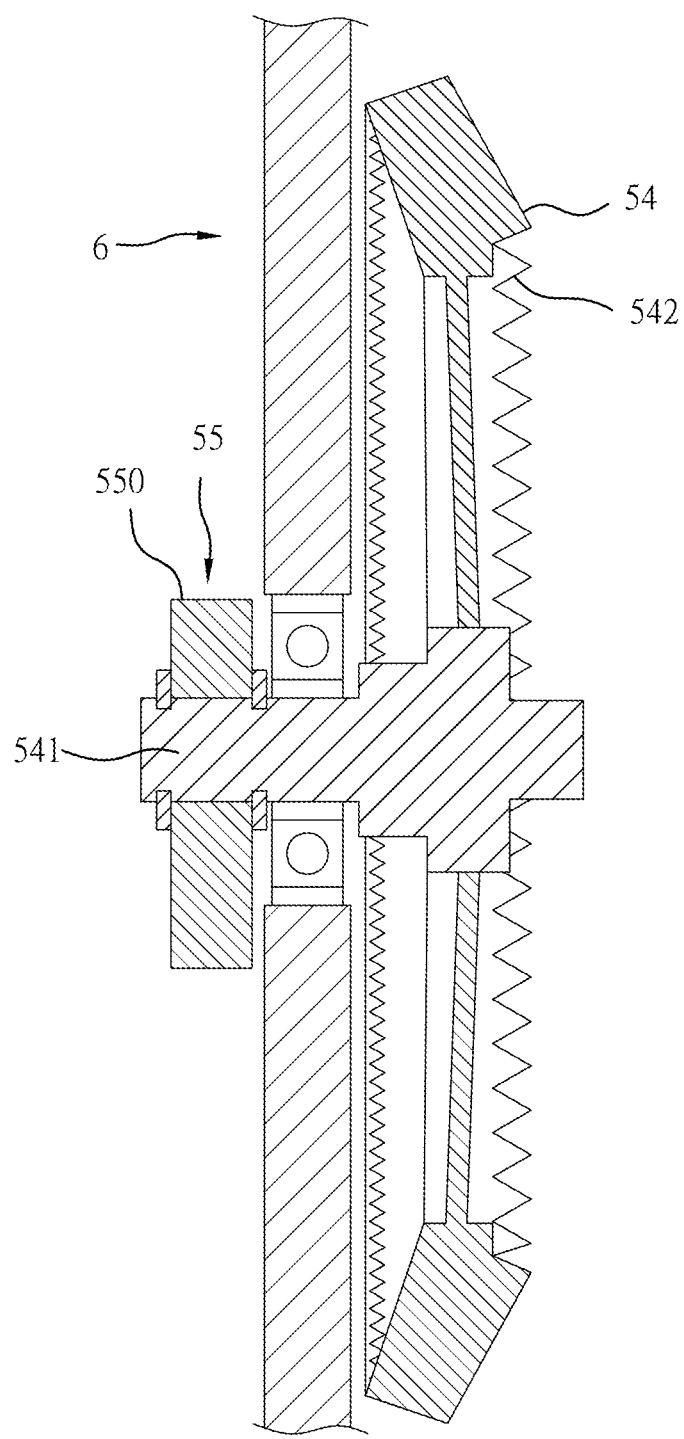
FIG. 15 is a schematic sectional view of a part of the present invention, illustrating the arrangement of the middle bike frame with the second driving wheel and the related connector.
Figure 16:
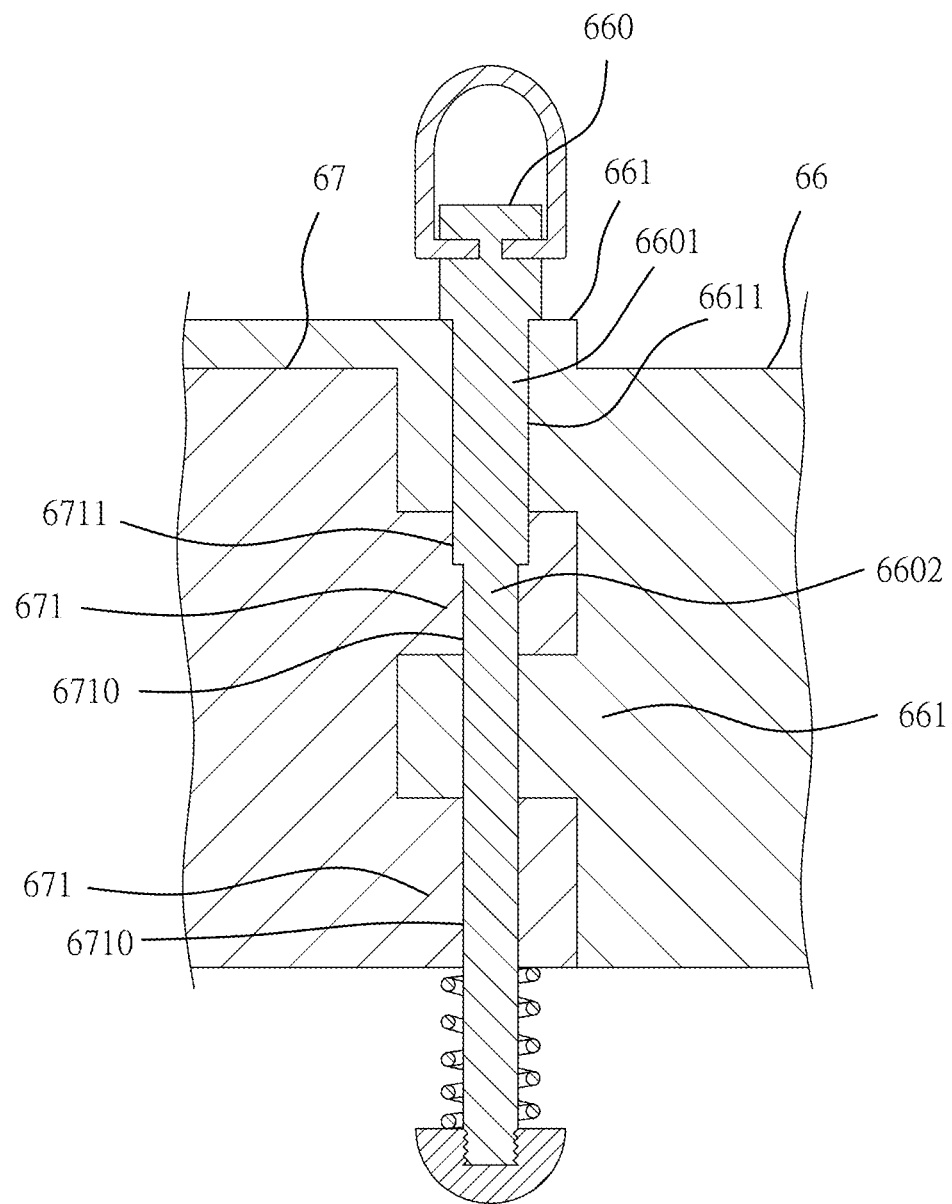
FIG. 16 is a schematic sectional view of a part of the present invention, illustrating the arrangement of the middle bike frame with the upright support and the rear transverse bar.
Figure 17:
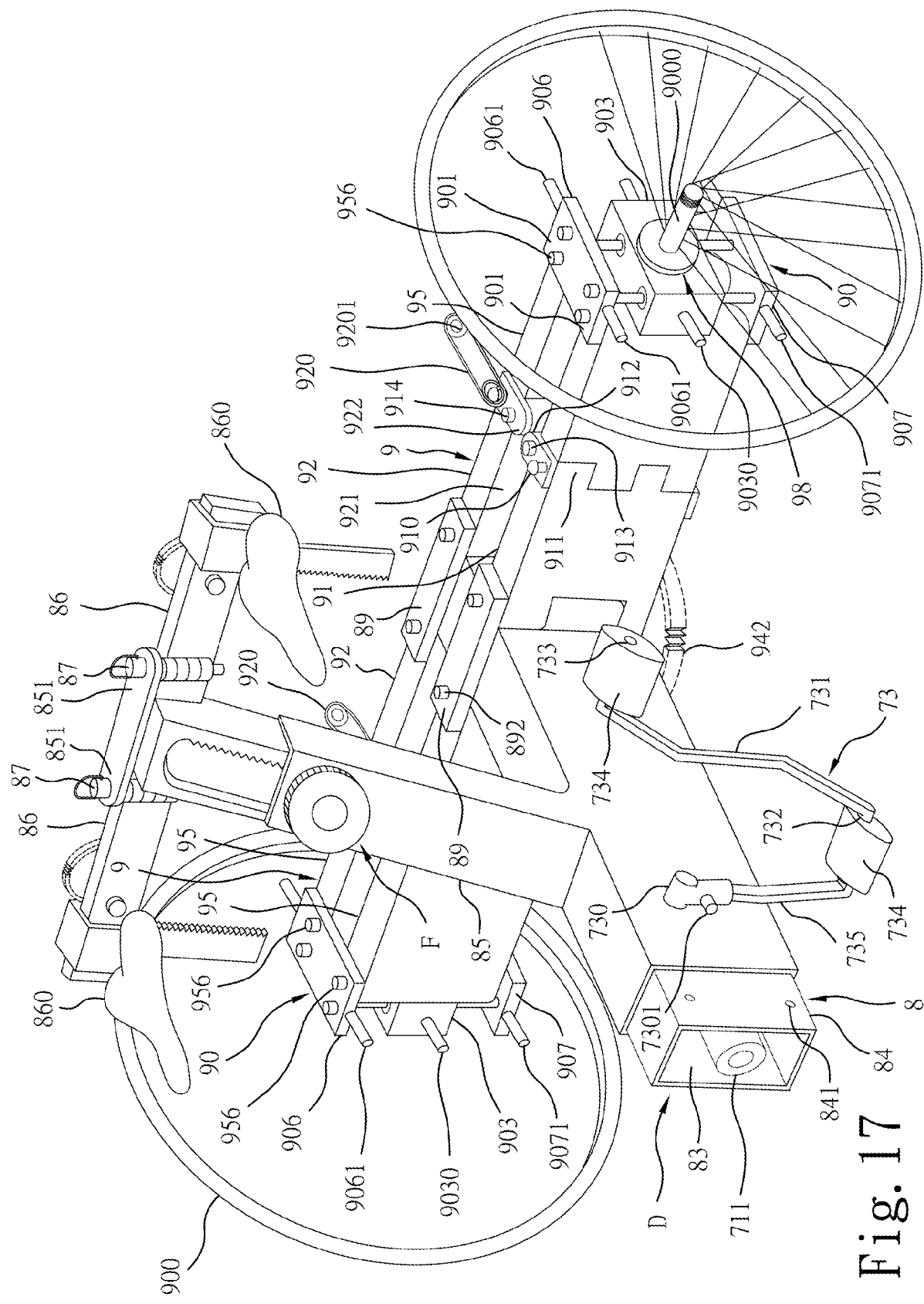
FIG. 17 is a schematic elevational view of a part of the present invention, illustrating the arrangement of the rear bike frame and the related component parts.
Figure 18:
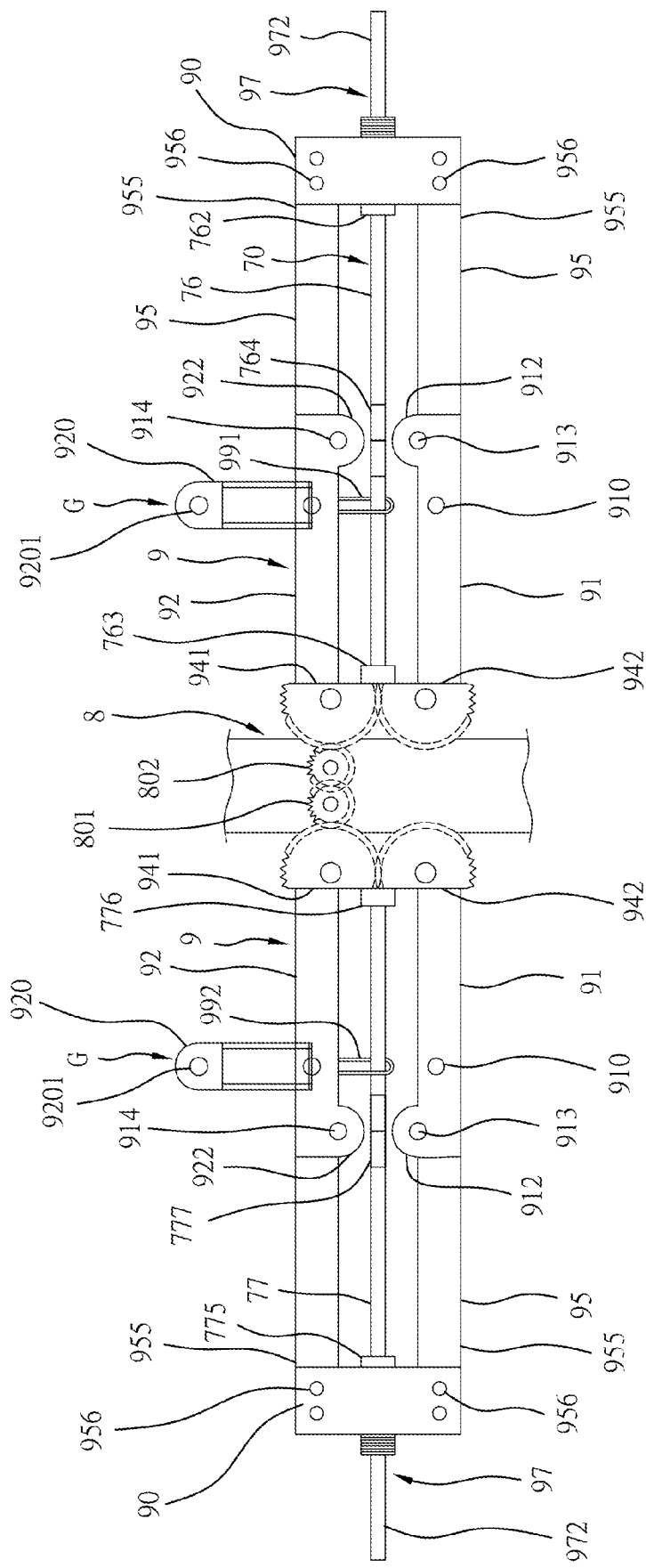
FIG. 18 is a schematic plain assembly view of a part of the present invention, illustrating the arrangement of the rear bike frame, rear transmission shaft, rear transverse frames and rear wheel brackets.
Figure 19:
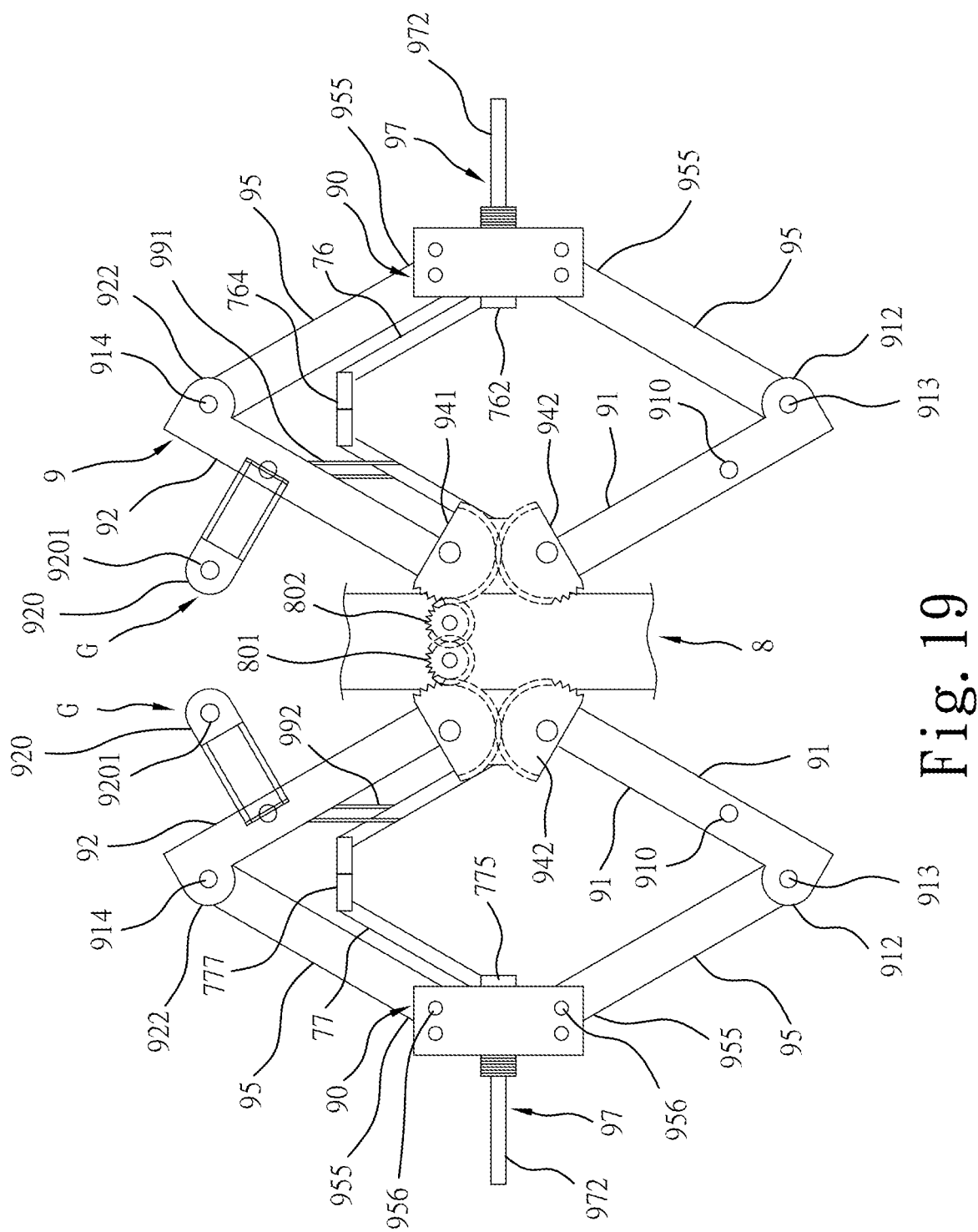
FIG. 19 is a schematic plain view of a part of the present invention, illustrating a collapsing motion of the rear bike frame, rear transmission shaft, rear transverse frames and rear wheel brackets.
Figure 20:
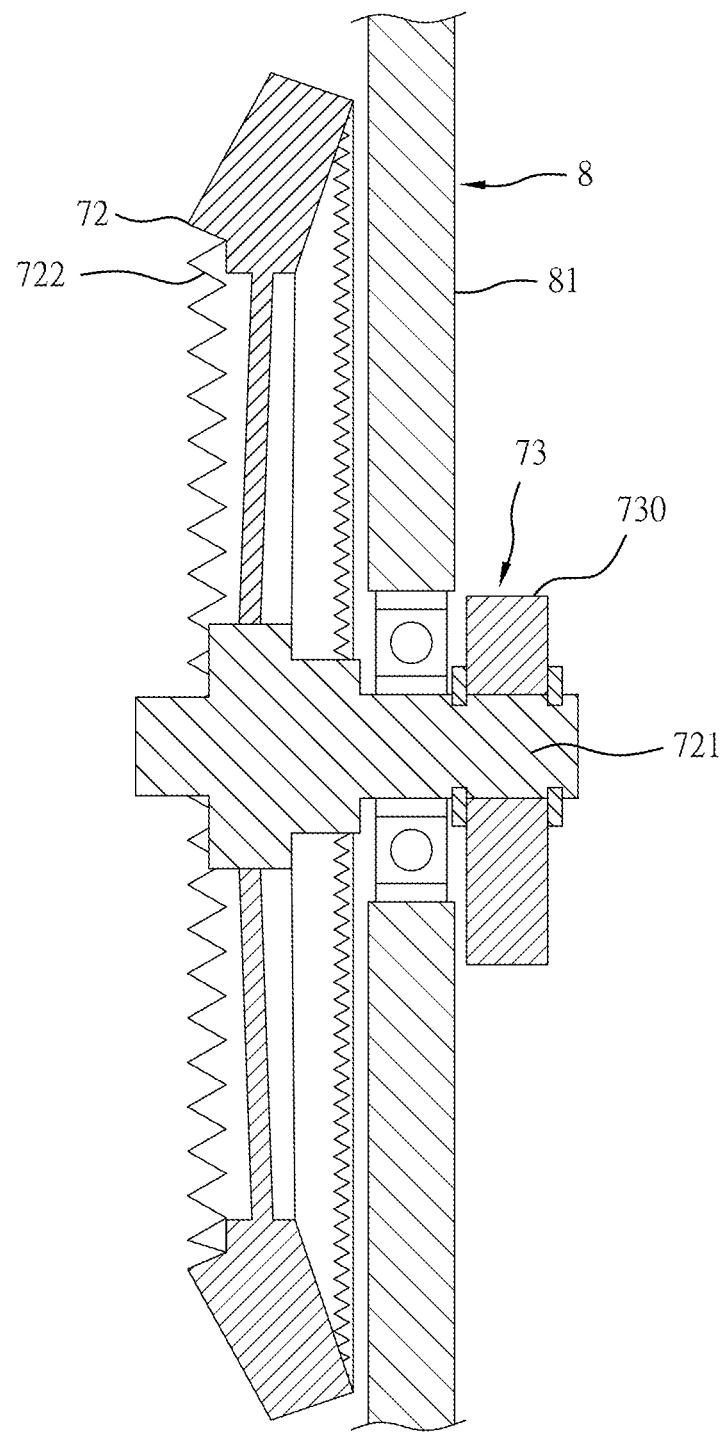
FIG. 20 is a sectional view, in an enlarged scale, of a part of the present invention, illustrating the arrangement of the rear bike frame with the third driving wheel and the related connector.
Figure 21:
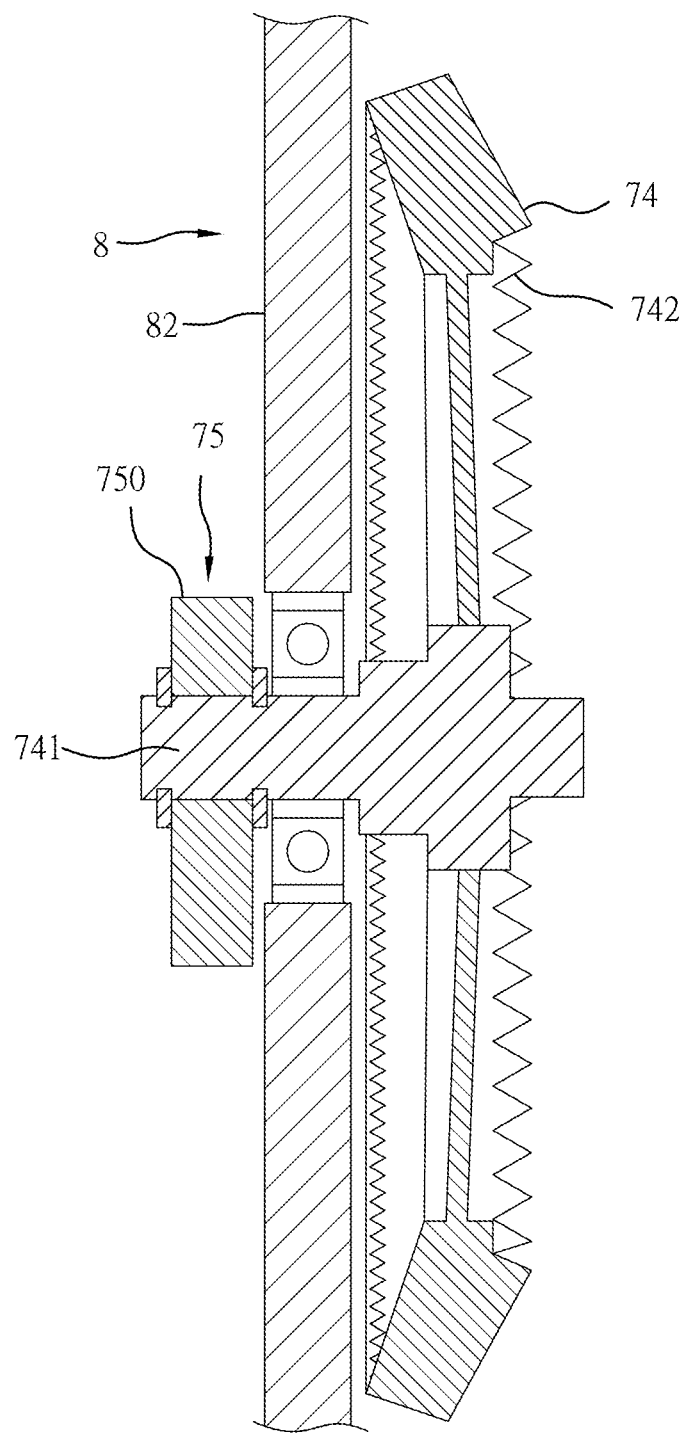
FIG. 21 is a sectional view, in an enlarged scale, of a part of the present invention, illustrating the arrangement of the rear bike frame with the fourth driving wheel and the related connector.
Figure 22:
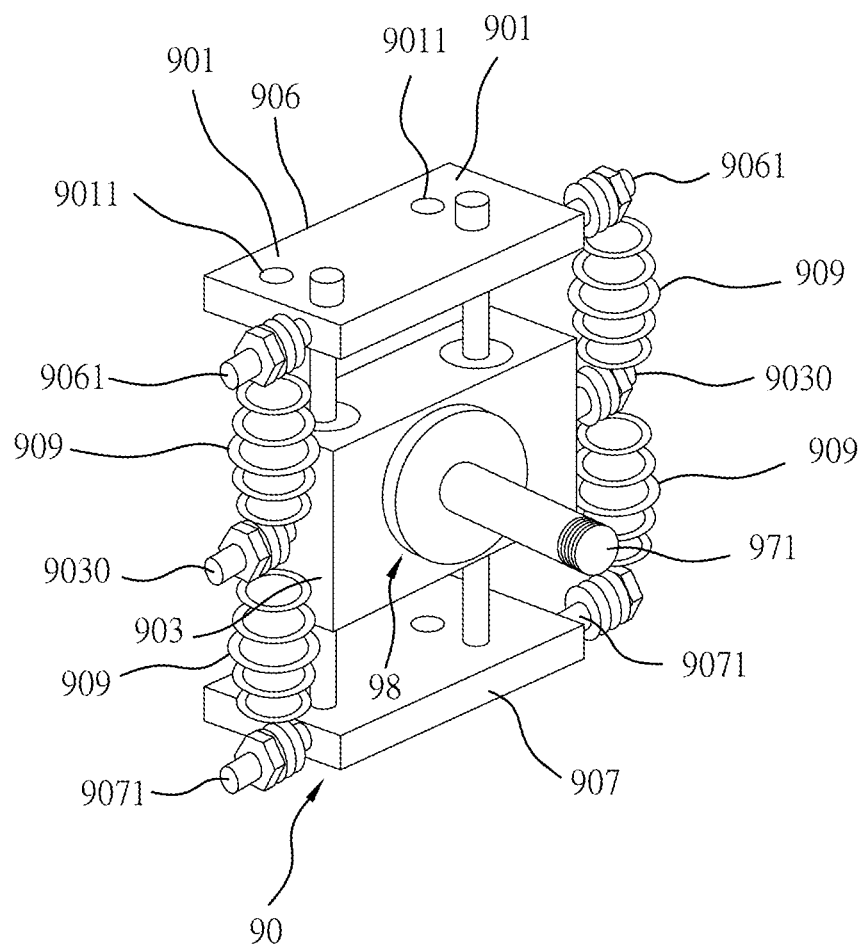
FIG. 22 is an elevational view, in an enlarged scale, of the rear wheel bracket of the combination buddy bicycle in accordance with the present invention.
Figure 23:
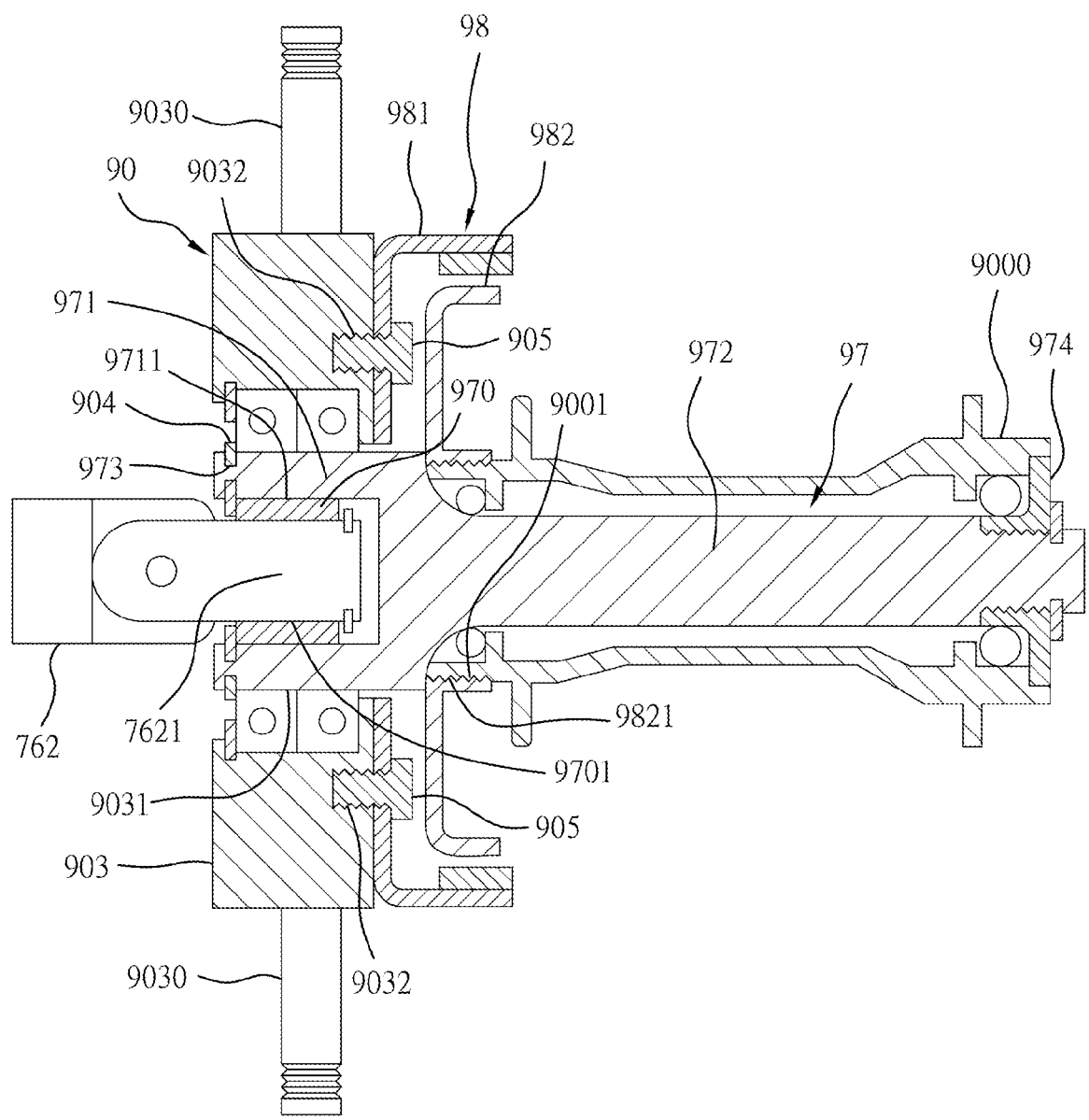
FIG. 23 is a sectional view, in an enlarged scale, of the rear wheel bracket and rear wheel of the combination buddy bicycle in accordance with the present invention.
Figure 25:
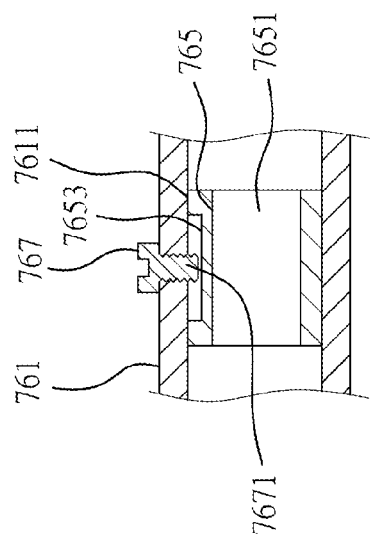
FIG. 25 is a sectional assembly view of a part of FIG. 24.
Figure 24:
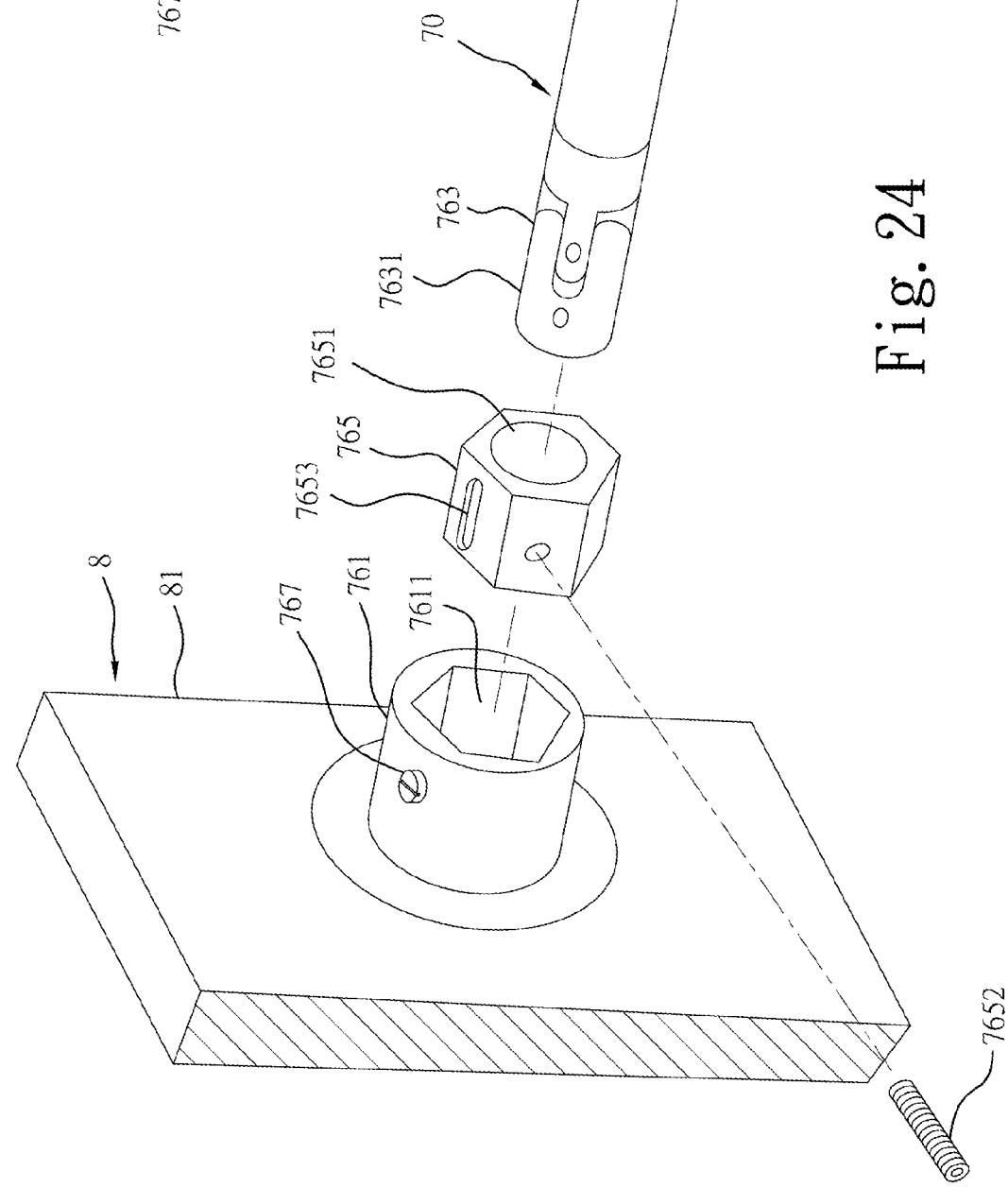
FIG. 24 is an exploded view, in an enlarged scale, of one end of the rear wheel transmission shaft of the combination buddy bike in accordance with the present invention.
Figure 26:
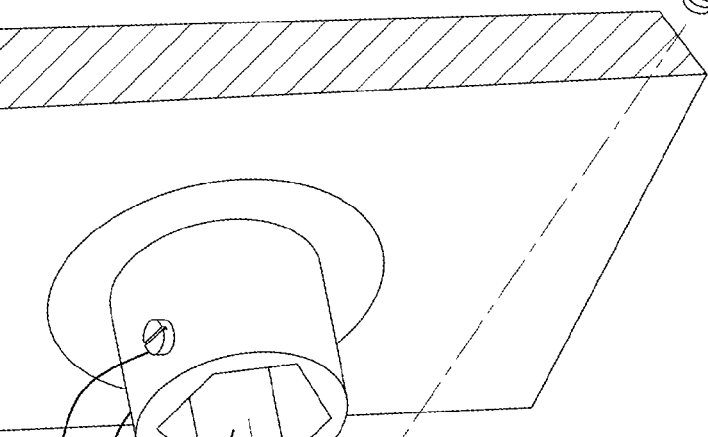
FIG. 26 is an exploded view, in an enlarged scale, of the other end of the rear wheel transmission shaft of the combination buddy bike in accordance with the present invention.
Figure 27:
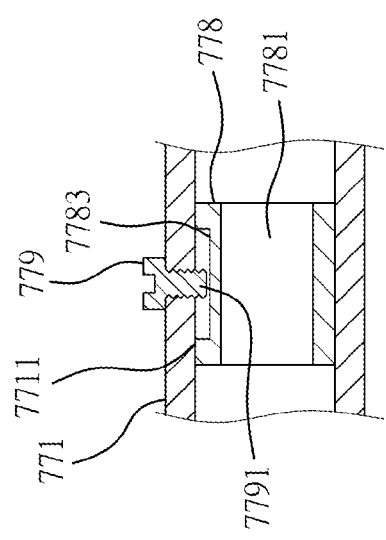
FIG. 27 is a sectional assembly view of a part of FIG. 26.
Figure 28:
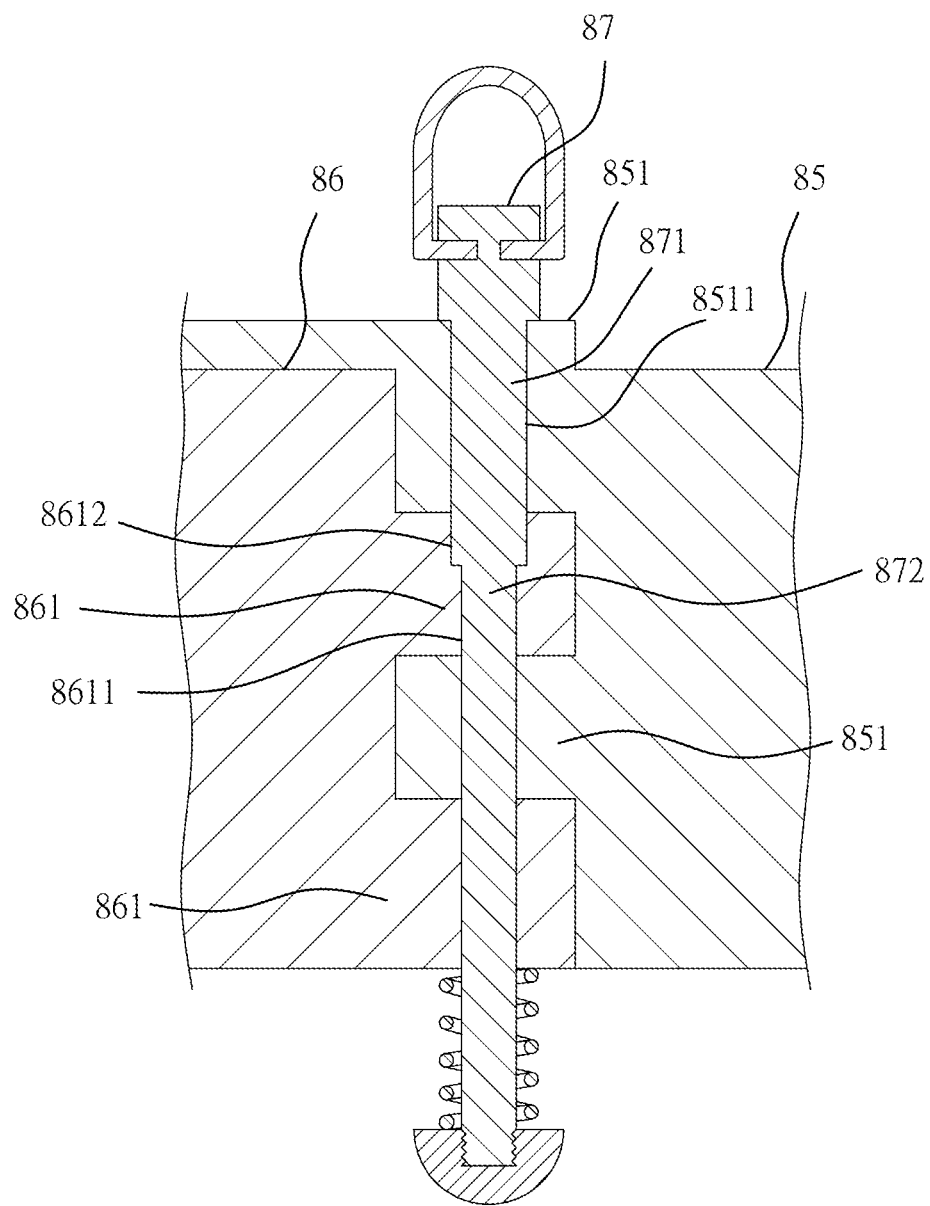
FIG. 28 is a schematic sectional view, in an enlarged scale of a part of the present invention, illustrating the arrangement of the upright support of the rear bike frame and the rear transverse bar.

The two transverse frames 2 each comprise an inner connection portion 21 (see FIG. 5, FIG. 6, FIG. 7 and FIG. 11), a locating hole 211 vertically extending through the inner connection portion 21 for the passing of one respective locating bolt 12 of the front bike frame 1 and having a polygonal top portion 2111 fitting the polygonal head 121 of the respective locating bolt 12 to prohibit the respective transverse frame 2 from biasing relative to the front bike frame 1. When lifting the two locating bolts 12 to disengage the respective polygonal heads 121 from the polygonal top portions 2111 of the respective locating holes 211, the two transverse frames 2 can be biased relative to the front bike frame 1, facilitating collapsing the combination buddy bicycle (see FIG. 30). Further, as shown in FIG. 2 and FIG. 11, the two transverse frames 2 each comprise an upper pivot lug 22 and a lower pivot hole 23 disposed at an outer end thereof at different elevations and respectively pivotally coupled to the two steering control bars 4 and the two front wheel brackets 3. The upper pivot lug 22 of each transverse frame 2 defines a bottom coupling hole 222 and a backwardly tilted top coupling hole 221 for the connection of a steering universal joint 45 pivotally. The steering universal joint 45 has a first end 451 thereof pivotally connected to the bottom coupling hole 222 of the upper pivot lug 22, and a second end 452 thereof pivotally connected to the top coupling hole 221 of the upper pivot lug 22.

The two front wheel brackets 3 each comprise a coupling hole 31 for the coupling of the steering control bars 4 and the transverse frames 2, fastening elements 311 transversely fastened thereto and extending across the coupling hole 31 to lock the steering control bars 4 (see FIG. 2 and FIG. 11), a wheel seat 32 (see FIG. 5, FIG. 11 and FIG. 12) defining an axle hole 321 (see FIG. 12), a front wheel axle 33, which has an inner end 331 mounted in the axle hole 321 and an outer end 332 disposed outside the wheel seat 32, a front wheel 37 pivotally supported on the outer end 332 of the front wheel axle 33, and a fastening member 303 (see FIG. 12) fastened to the outer end 332 of the front wheel axle 33 to secure the front wheel 37 in place.

Figure 10:
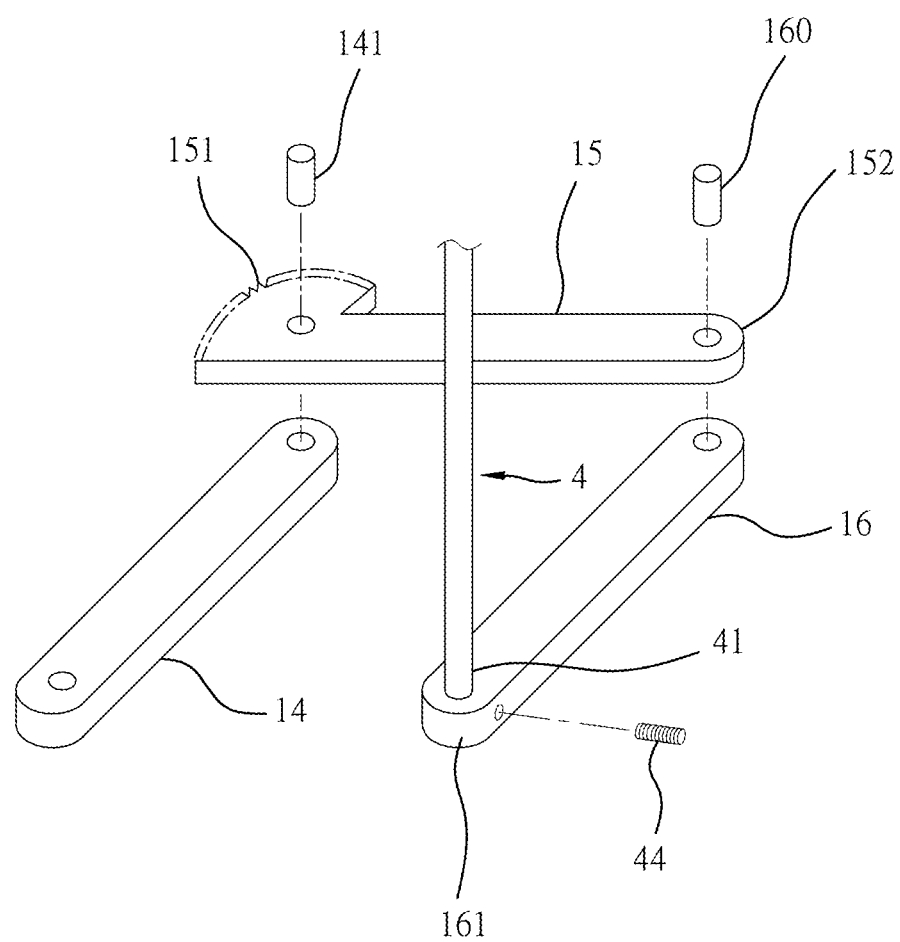
FIG. 10 is an exploded view of one steering control bar, one outer longitudinal link, one rear transverse link and one inner longitudinal link in accordance with the present invention.

The two steering control bars 4 are respectively connected to the two front wheel brackets 3 by fastening members 311 (see FIG. 11), having respective top ends 42 thereof respectively pivotally coupled to the first ends 451 of the steering universal joints 45 at the transverse frames 2 (see FIG. 2) and respective bottom ends 41 thereof respectively inserted through the transverse frames 2 and the front wheel brackets 3 and connected to respective front ends 161 of two outer longitudinal links 6 by respective fastening members 44 (see FIG. 10). The two outer longitudinal links 16 have respectively rear ends thereof respectively pivotally connected to respective outer ends 152 of the two rear transverse links 15 by pivot connectors 160 (see FIGS. 8-11).

The two head tubes 430 have respective bottom ends 4301 thereof respectively connected to the second ends 452 of the steering universal joints 45 at the two steering control bars 4, and respective top ends thereof coupled with a respective retractable bar 431 and a respective top handlebar 43. Thus, when one handlebar 43 is biased by the rider, the associating head tube 430 and the associating steering universal joint 45 are driven to move the associating steering control bar 4 and the associating front wheel bracket 3, causing the associating outer longitudinal link 16 to move the associating rear transverse link 15 and the associating inner longitudinal link 14, and at the same time, the other rear transverse link 15 is driven to move the other inner longitudinal link 14 and the other front wheel bracket 3 (see FIG. 9) subject to relative motion between the engaged sector gears 151 of the rear transverse links 15, ensuring high steering stability.

The front transmission shaft 51 is axially pivotally mounted in the middle bike frame 6 (see FIG. 3 and FIG. 29), having a first one-way transmission bevel gear 511 (formed of a bevel gear and an one-way bearing in the bevel gear) and a first clutch 512 respectively fixedly mounted on opposing front and rear ends thereof and a second one-way transmission bevel gear 513 fixedly mounted at a middle part thereof in a reversed direction relative to the first one-way transmission bevel gear 511.

Figure 3:
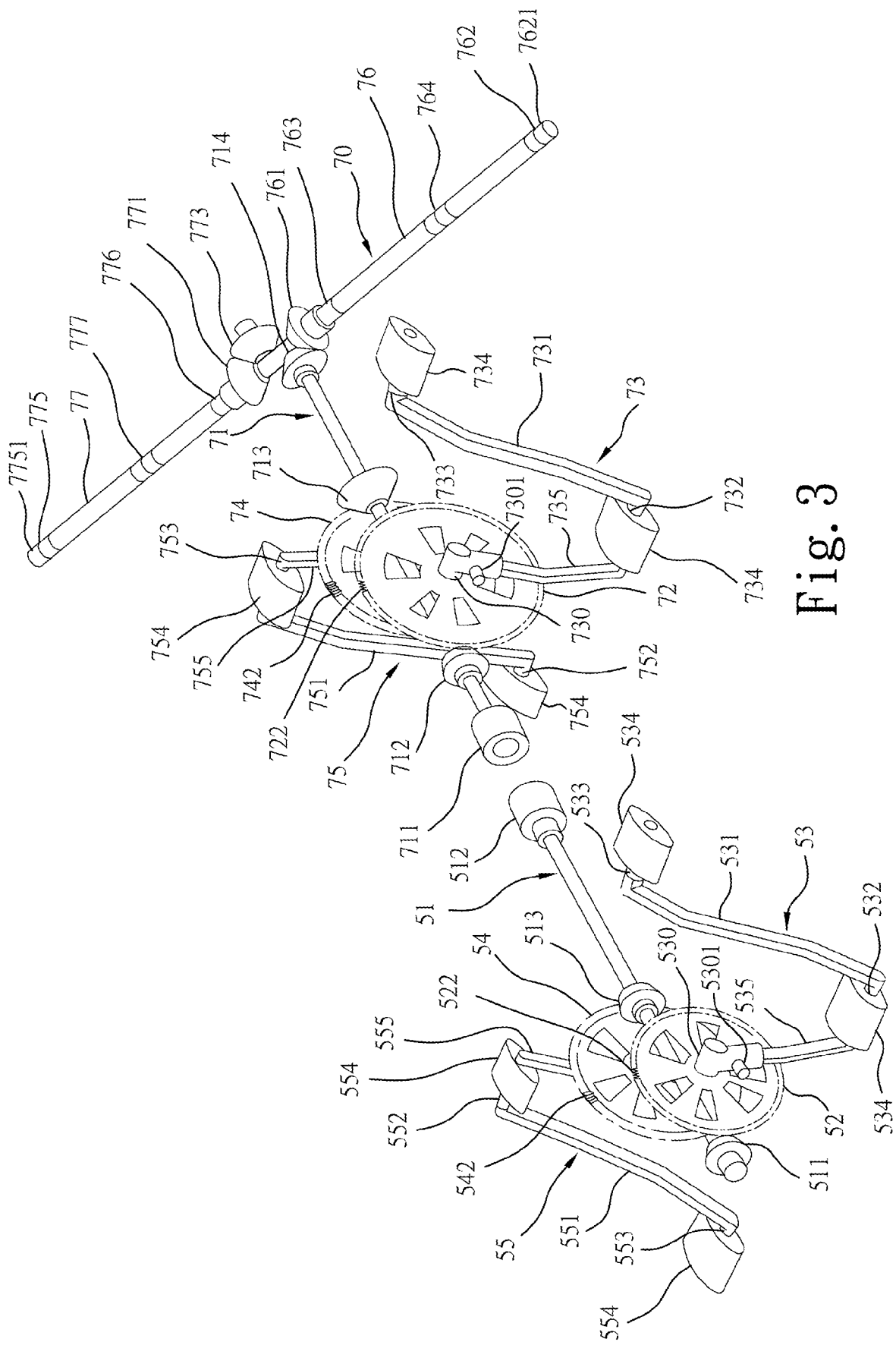
FIG. 3 is a schematic elevational view of the present invention, illustrating the transmission structure of the combination buddy bicycle.
Figure 4:
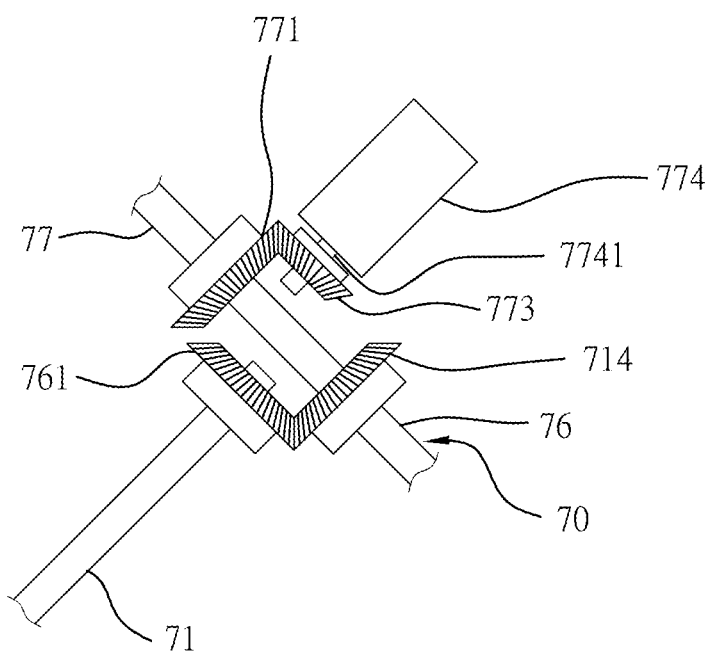
FIG. 4 is a schematic plain view of a part of the transmission structure of the combination buddy bicycle in accordance with the present invention.
Figure 5:
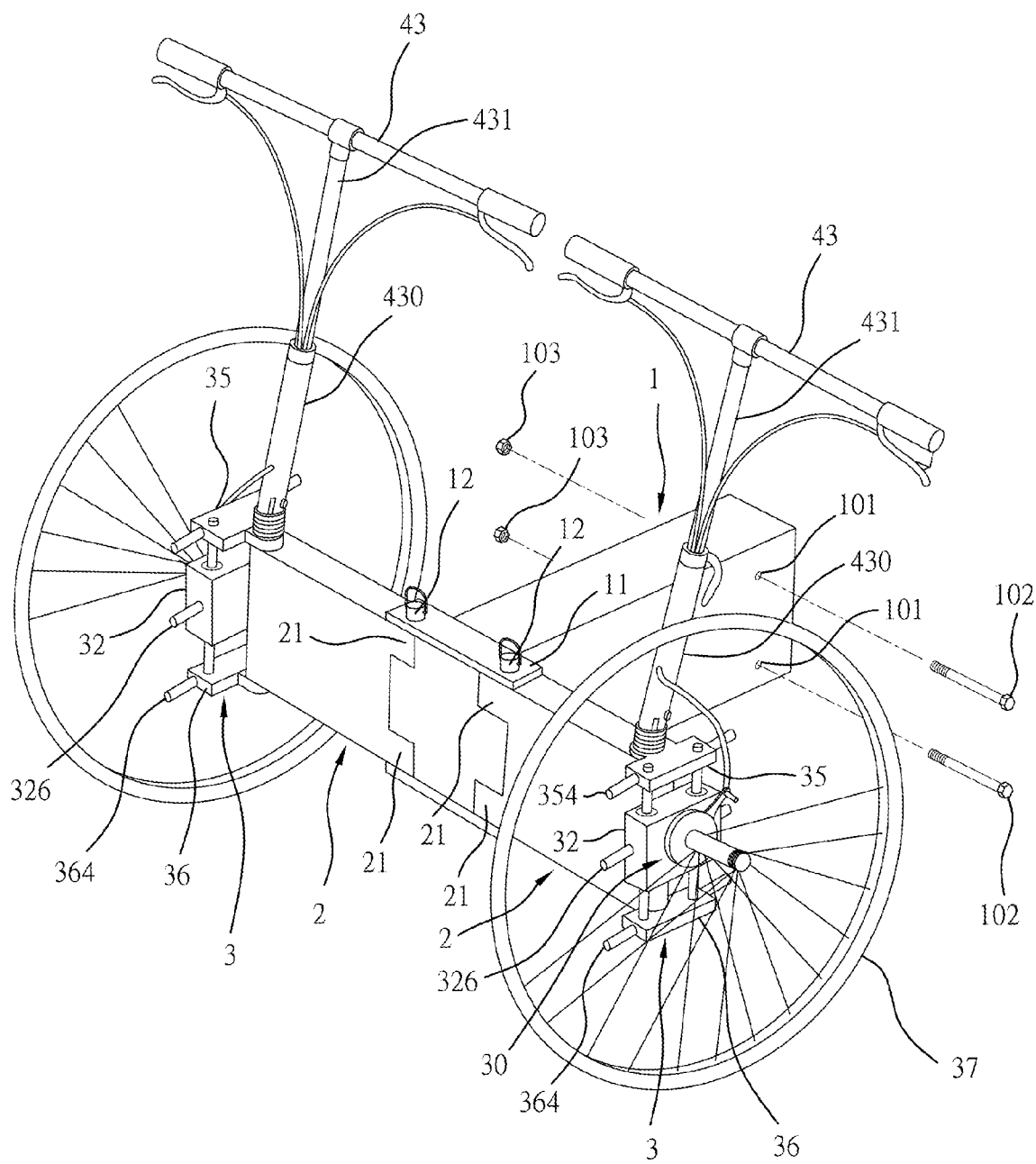
FIG. 5 is an elevational view of a part of the present invention, illustrating the arrangement of the front bike frame and related component parts.
Figure 6:
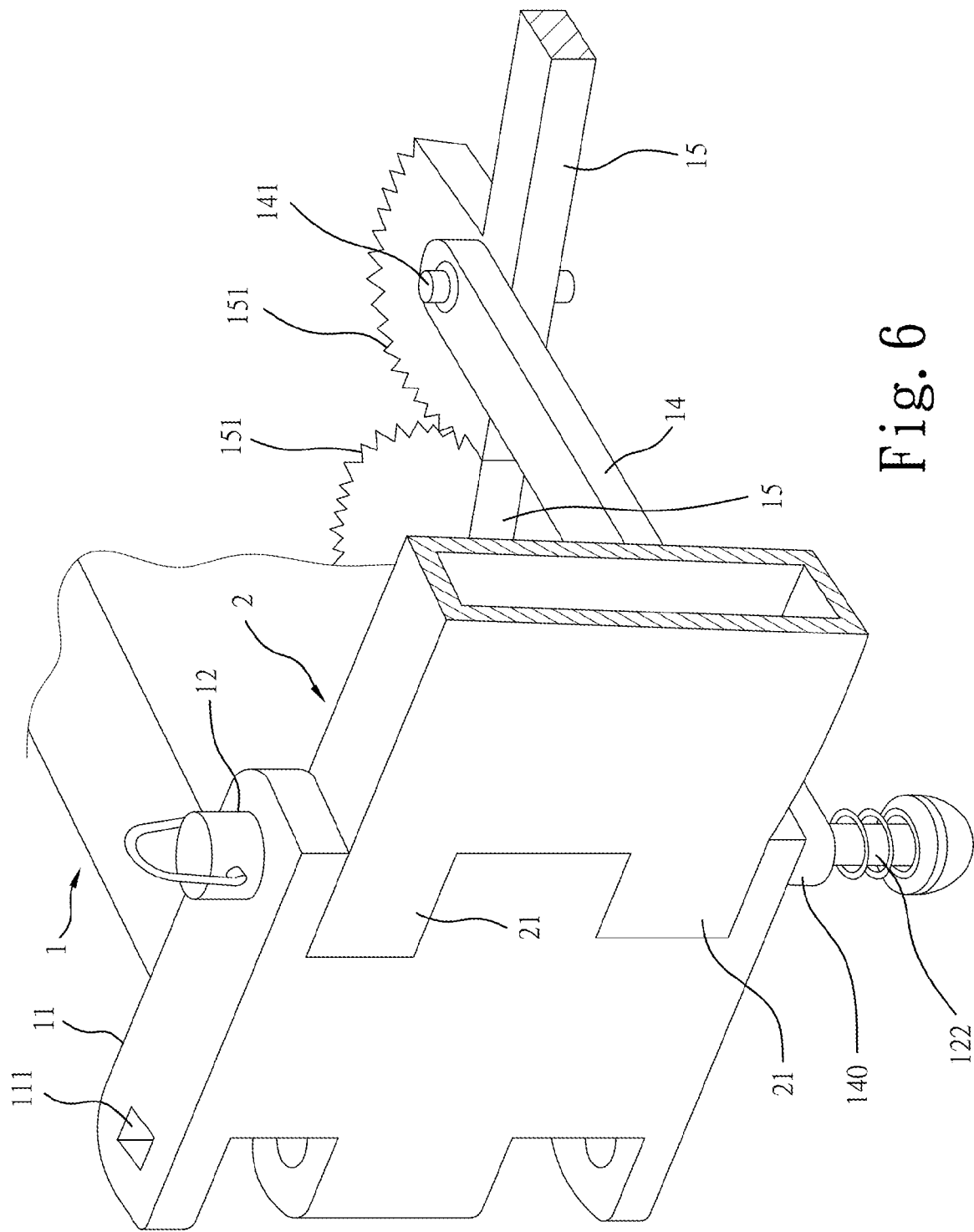
FIG. 6 is a sectional elevation, in an enlarged scale, of a part of the combination buddy bicycle in accordance with the present invention, illustrating the arrangement of the front bike frame and one transverse frame.
Figure 7:
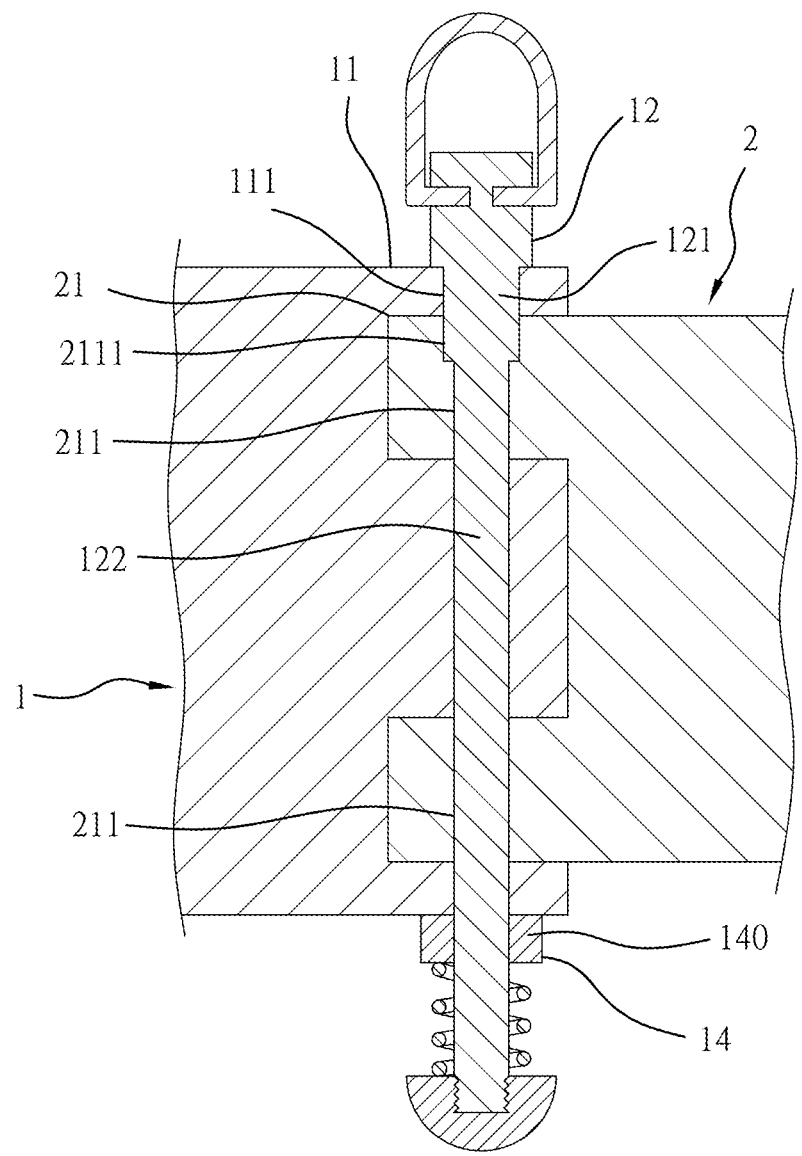
FIG. 7 is a sectional view of a part of FIG. 6.
Figure 8:
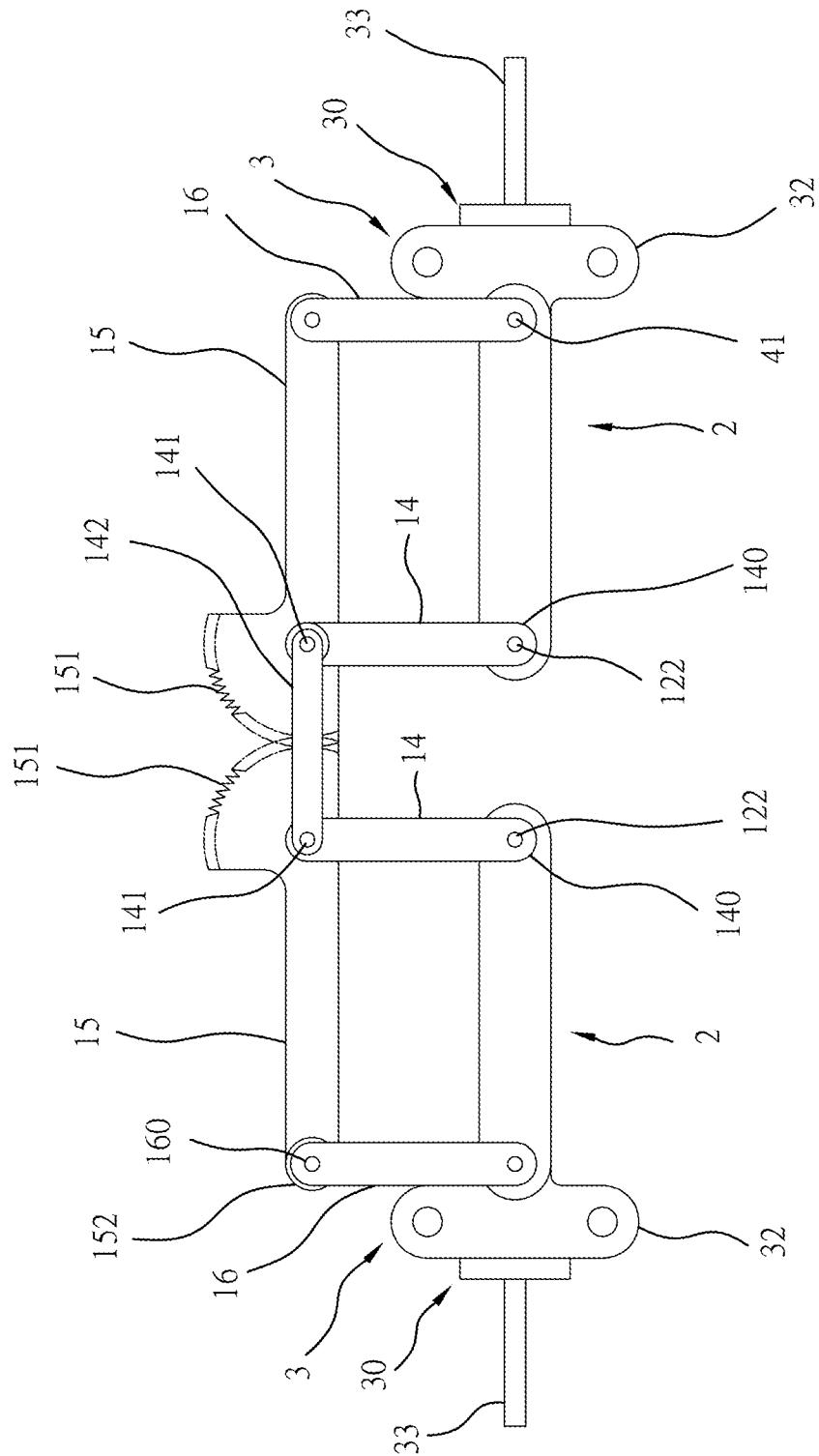
FIG. 8 is a schematic plain view of a part of the present invention, illustrating the arrangement of the steering control bars, transverse frames, front wheel brackets, inner and outer longitudinal links and rear transverse links.
Figure 9:
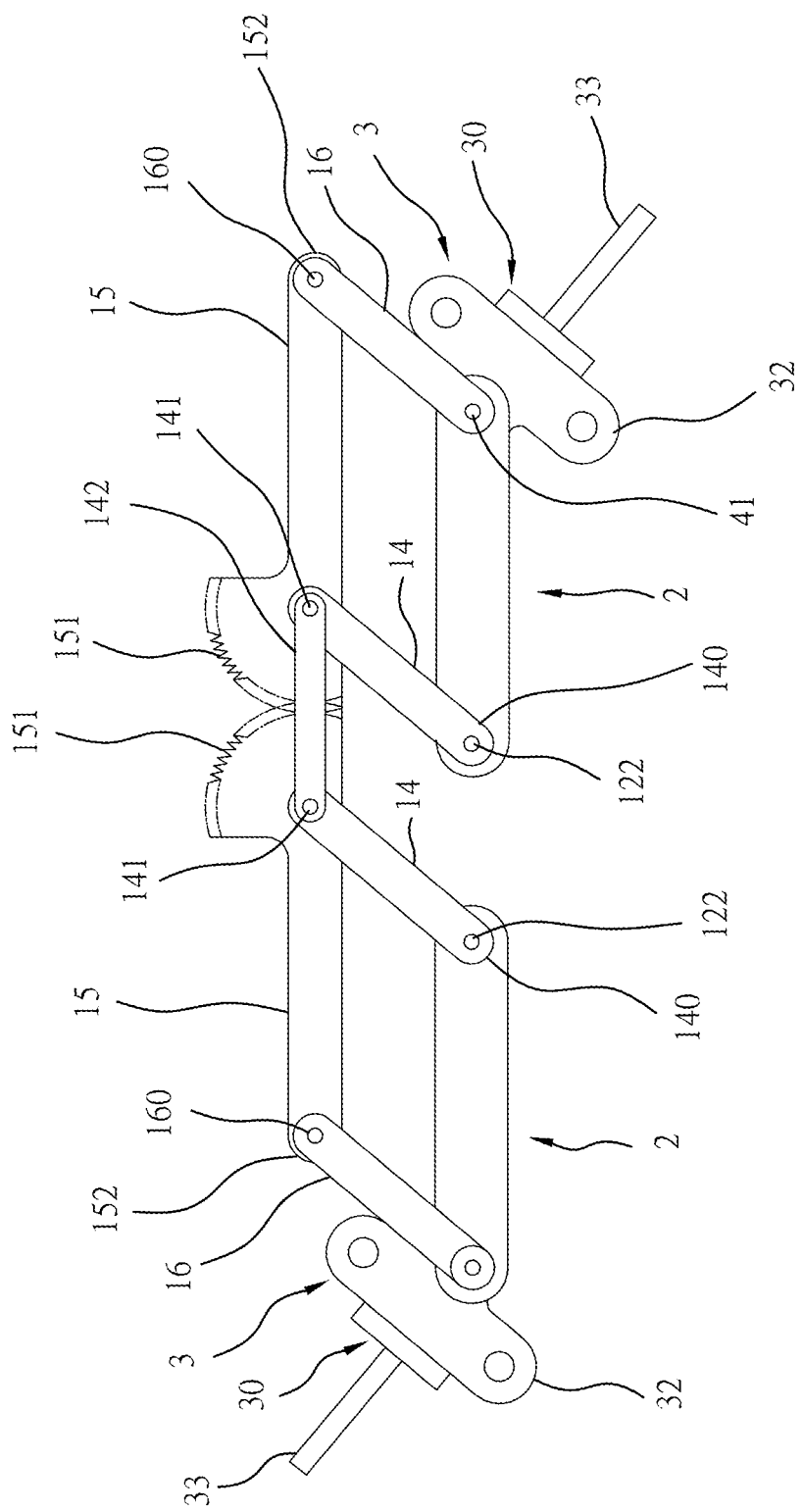
FIG. 9 is a schematic plain view of a part of the present invention, illustrating the arrangement of one steering control bar, one front wheel bracket, one outer longitudinal link, one rear transverse link, one inner longitudinal link, the other rear transverse link, the other inner longitudinal link, the other outer longitudinal link and the other front wheel bracket.
Figure 29:
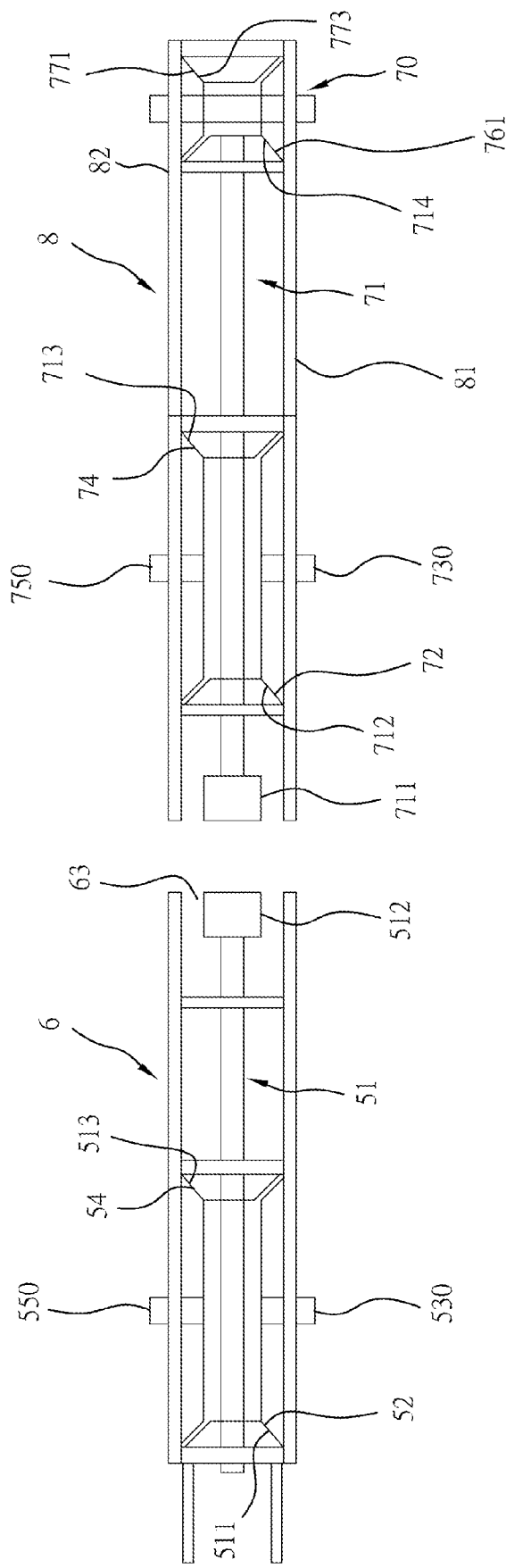
FIG. 29 is a top plain view of a part of the present invention, illustrating the arrangement of the middle bike frame and the rear bike frame.
Figure 30:
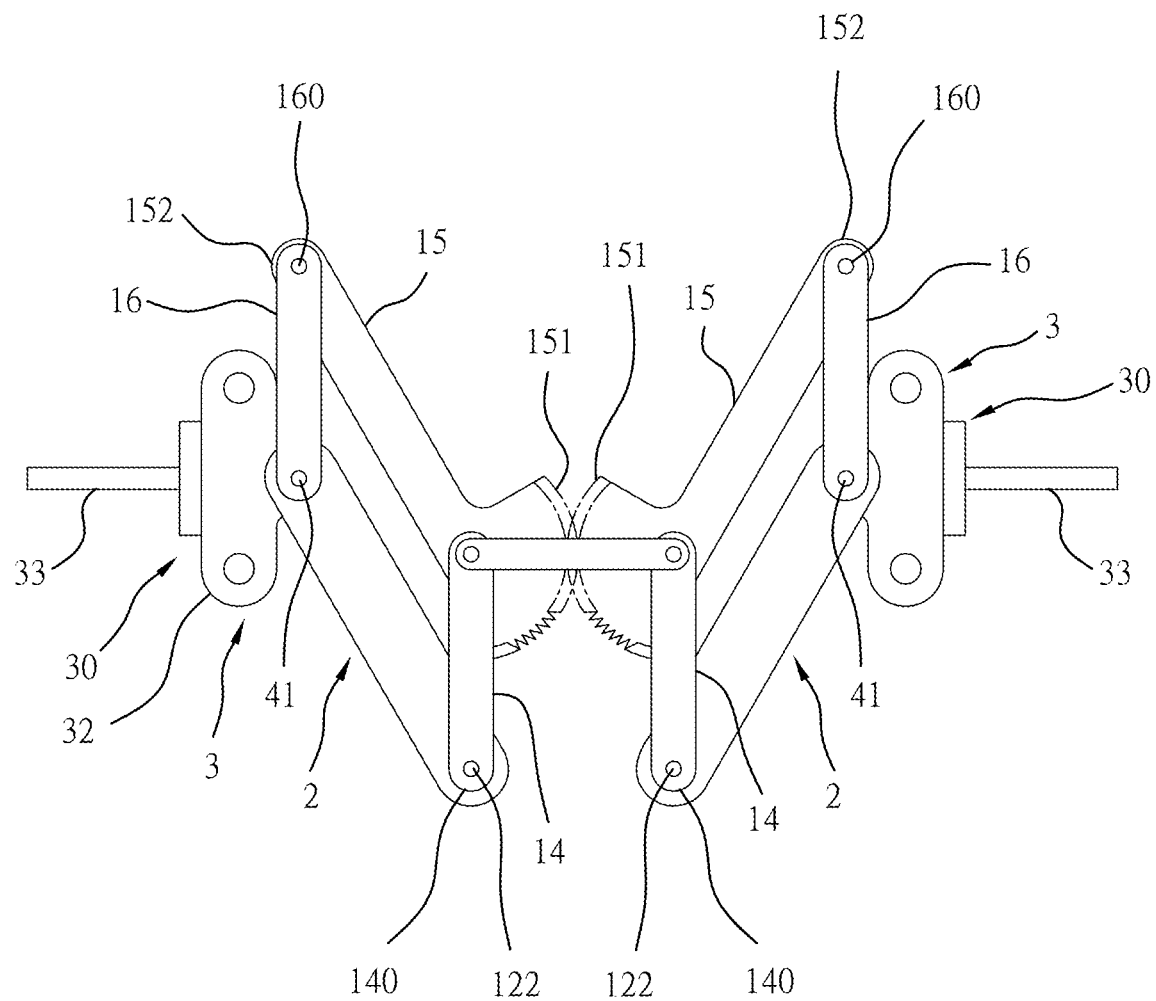
FIG. 30 is a schematic plain view of the present invention, illustrating a collapsing motion of the front wheel brackets, the inner and outer longitudinal links and the rear transverse links.
Figure 31:
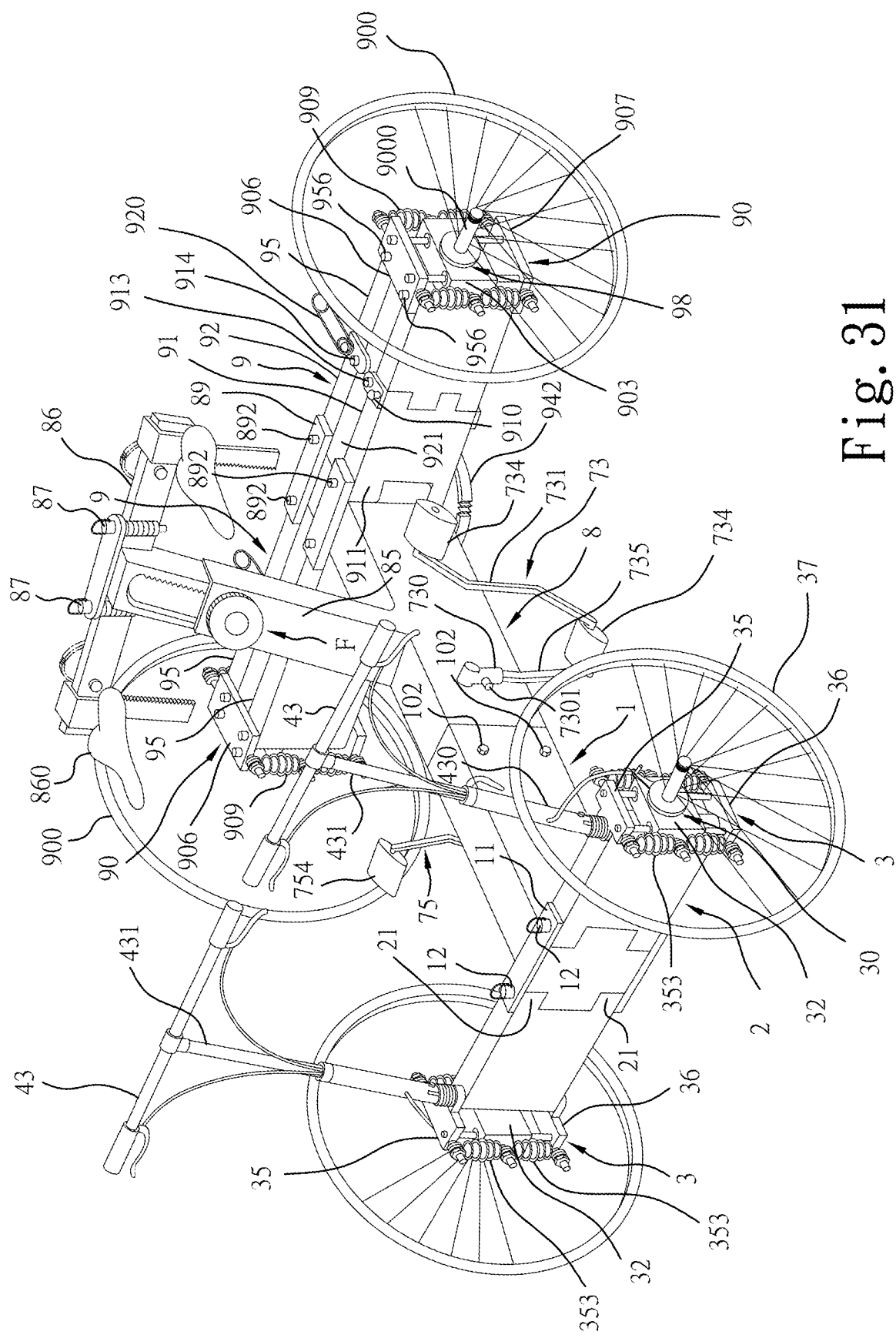
FIG. 31 is an elevational view of a part of the present invention, illustrating the arrangement of the front bike frame and the rear bike frame.

The first driving wheel 52 comprises a wheel axle 521 (see FIG. 14) pivotally mounted in the middle bike frame 6, and a bevel gear 522 formed integral with the periphery thereof and meshed with the first one-way transmission bevel gear 511 of the front transmission shaft 51 (see FIG. 3 and FIG. 29).

The first pedal assembly 53 (see FIG. 3 and FIG. 13) comprises a pedal crank 531, two pedal pins 532; 533 respectively disposed at the two distal ends of the pedal crank 531, two pedals 534 respectively pivotally supported on the pedal pins 532; 533, a connection rod 535 connected to one pedal pin 532, and a connector 530 (see FIG. 3 and FIG. 14) connecting the connection rod 535 to the wheel axle 521 of the first driving wheel 52 with a lock pin 5301 (see FIG. 1). After removal of the lock pin 5301, the first pedal assembly 53 can be received to the middle bike frame 6.

The second driving wheel 54 comprises a wheel axle 541 (see FIG. 15) pivotally mounted in the middle bike frame 6, and a bevel gear 542 formed integral with the periphery thereof and meshed with the second one-way transmission bevel gear 513 of the front transmission shaft 51 (see FIG. 3 and FIG. 29).

The second pedal assembly 55 (see FIG. 3) comprises a pedal crank 551, two pedal pins 552; 553 respectively disposed at the two distal ends of the pedal crank 551, two pedals 554 respectively pivotally supported on the pedal pins 552; 553, a connection rod 555 connected to one pedal pin 552, and a connector 550 (see FIG. 3 and FIG. 15) connecting the connection rod 555 to the wheel axle 521 of the second driving wheel 54 with a lock pin (not shown). After removal of the lock pin from the second pedal assembly 55, the second pedal assembly 55 can be received to the middle bike frame 6.

The middle bike frame 6 (see FIG. 1, FIG. 2, FIG. 13 and FIG. 29) is pivotally coupled with the front transmission shaft 51 to support the first driving wheel 52 (see FIG. 14) and the second driving wheel 54 (see FIG. 15) at two opposite lateral sides thereof and the first clutch 512 of the front transmission shaft 51 at the rear side thereof (see FIG. 29), comprising a front mounting structure B for connection to the front bike frame 1 and a rear mounting structure C for connection to the rear bike frame 8. The front mounting structure B comprises a coupling tube 62 for receiving the rear end of the front bike frame 1, a plurality of mounting through holes 621 transversely extending through the coupling tube 62, and a plurality of screws 102 respectively inserted through the mounting through holes 621 and the rear end of the front bike frame 1, and a plurality of nuts 103 respectively threaded onto the screws 102 to secure the front end of the middle bike frame 6 to the rear end of the front bike frame 1. The rear mounting structure C (see FIG. 13) comprises a coupling tube 63 (see FIG. 29) for receiving the front end of the rear bike frame 8, a plurality of mounting through holes 631 transversely extending through the coupling tube 63, and a plurality of screws 64 respectively inserted through the mounting through holes 631 and the rear end of the front bike frame 1, and a plurality of nuts 65 respectively threaded onto the screws 64 to secure the rear end of the middle bike frame 6 to the front end of the rear bike frame 8. The middle bike frame 6 further comprises an upright support 66 (see FIG. 13), an elevation adjustment structure E (see FIG. 13) mounted at the upright support 66, two front saddle support bars 67 coupled to the upright support 66 and adjustable to the desired elevation by means of the elevation adjustment structure E, two saddles 68 respectively mounted at the front saddle support bars 67, two handlebar stems 69 respectively mounted at the front saddle support bars 67, and two handlebars 691 respectively fastened to the handlebar stems 69, a support plate 661 (see FIG. 13 and FIG. 16) arranged at the top side of the upright support 66, two locating bolts 660 mounted at the support plate 661 and respectively coupled to respective coupling portions 671 of the front saddle support bars 67. Each locating bolt 660 has a polygonal head 6601 positioned in a respective polygonal hole 6611 at the support plate 661 (see FIG. 16) and a cylindrical shank 6602 downwardly inserted through a respective hole 6710 at the coupling portion 671 of the associating front saddle support bar 67. Thus, the locating bolts 660 prohibit the front saddle support bars 67 from biasing. When the locating bolts 660 are lifted to disengage the respective polygonal heads 6601 from the respective polygonal holes 6611 at the support plate 661, the front saddle support bars 67 can be biased to a collapsed position.

The rear transmission shaft 71 (see FIG. 3 and FIG. 29) is axially pivotally mounted in the rear bike frame 8, comprising a second clutch 711 disposed at the front end thereof and engageable with the first clutch 512 of the front transmission shaft 51, a third one-way transmission bevel gear 712 and a fourth one-way transmission bevel gear 713 longitudinally spaced behind the second one-way transmission bevel gear 711 in a reversed manner, a fifth one-way transmission bevel gear 714 disposed at the rear end thereof in a reversed direction relative to the fourth one-way transmission bevel gear 713.

The third driving wheel 72 comprises a wheel axle 721 (see FIG. 3, FIG. 20 and FIG. 29) pivotally mounted in the rear bike frame 8 and extending out of one sidewall 81 of the rear bike frame 8 (see FIG. 20) and then connected to the third pedal assembly 73, and a bevel gear 722 formed integral with the periphery thereof and meshed with the third one-way transmission bevel gear 712 of the rear transmission shaft 71.

The third pedal assembly 73 (see FIG. 3 and FIG. 17) comprises a pedal crank 731, two pedal pins 732; 733 respectively disposed at the two distal ends of the pedal crank 731, two pedals 734 respectively pivotally supported on the pedal pins 732; 733, a connection rod 735 connected to one pedal pin 732, and a connector 730 connecting the connection rod 735 to the wheel axle 721 of the third driving wheel 72 with a lock pin 7301. After removal of the lock pin 7301 from the third pedal assembly 73, the third pedal assembly 73 can be received to the rear bike frame 8.

The fourth driving wheel 74 comprises a wheel axle 741 (see FIG. 3, FIG. 21 and FIG. 29) pivotally mounted in the rear bike frame 8 and extending out of the other sidewall 82 of the rear bike frame 8 (see FIG. 21) and then connected to the fourth pedal assembly 75, and a bevel gear 742 formed integral with the periphery thereof and meshed with the fourth one-way transmission bevel gear 713 of the rear transmission shaft 71.

The fourth pedal assembly 75 comprises a pedal crank 751, two pedal pins 752; 753 respectively disposed at the two distal ends of the pedal crank 751, two pedals 754 respectively pivotally supported on the pedal pins 752; 753, a connection rod 755 connected to one pedal pin 752, and a connector 750 connecting the connection rod 755 to the wheel axle 741 of the fourth driving wheel 74 with a lock pin (not shown). After removal of the lock pin from the fourth pedal assembly 75, the fourth pedal assembly 75 can be received to the rear bike frame 8.

The rear wheel transmission shaft 70 (see FIG. 3, FIG. 24, FIG. 26 and FIG. 29) is transversely pivotally mounted in the rear bike frame 8, comprising a first shaft 76 disposed at one side of one sidewall 81 of the rear bike frame 8, and a second shaft 77 disposed at one side of the other sidewall 82 of the rear bike frame 8. The first shaft 76 comprises a first rear bevel gear 761 disposed at one end thereof (see FIG. 3 and FIG. 24) and pivotally connected to one sidewall 81 of the rear bike frame 8 and meshed with the fifth one-way transmission bevel gear 714 of the rear transmission shaft 71, a first universal joint 762 coupled with one end thereof to the other end of the first shaft 76 and with the other end 7621 thereof to one of the two rear wheel brackets 90, a second universal joint 763 connected between the first shaft 76 and the first bevel gear 761, a third universal joint 764 connected between the first universal joint 762 and the second universal joint 763, a polygonal block 765 defining therein a hole 7651 for receiving one end 7631 of the second universal joint 763 and a sliding slot 7653, a polygonal hole 7611 formed in the first rear bevel gear 761 for receiving the polygonal block 765, a fastening member 7652 mounted in the polygonal block 765 to lock the second universal joint 763 to the polygonal block 765, and a positioning member 767 mounted in the first rear bevel gear 761 and having one end 7671 thereof engaged into the sliding slot 7653 of the polygonal block 765 (see FIG. 25) to lock the polygonal block 765 to the first rear bevel gear 761.

The second shaft 77 comprises a second rear bevel gear 771 disposed at one end thereof (see FIG. 3) and pivotally connected to the other sidewall 82 of the rear bike frame 8 (see FIG. 26), a third rear bevel gear 773 meshed with the second rear bevel gear 771, a motor 774 (see FIG. 4) having a motor shaft 7741 thereof connected with the third rear bevel gear 773, a fourth universal joint 775 disposed at an opposite end of the second shaft 77 and connected with a distal end 7751 thereof to the other rear wheel bracket 90, a fifth universal joint 776 connected to the second rear bevel gear 771, a sixth universal joint 77 connected between the fourth universal joint 775 and the fifth universal joint 776, a polygonal block 778 defining therein a hole 7781 for receiving one end 7761 of the fifth universal joint 776 and a sliding slot 7783, a polygonal hole 7711 formed in the second rear bevel gear 771 for receiving the polygonal block 778, a fastening member 7782 mounted in the polygonal block 778 to lock the second universal joint 763 to the polygonal block 765, and a positioning member 779 mounted in the second rear bevel gear 771 and having one end 7791 thereof engaged into the sliding slot 7783 of the polygonal block 778 to lock the polygonal block 778 to the second rear bevel gear 771.

The rear bike frame 8 (see FIG. 1, FIG. 17 and FIG. 29) is adapted to pivotally support the rear transmission shaft 71, the rear wheel transmission shaft 70, the third driving wheel 72 (see FIG. 20) and the fourth driving wheel 74 (see FIG. 21), comprising a front hole 83 toward which the second clutch 711 of the rear transmission shaft 71 faces, and a bike frame mounting structure D for connection to the front bike frame 1 or the middle bike frame 6. The bike frame mounting structure D comprises a coupling tube 84 surrounding the front hole 83 for receiving the rear end of the front bike frame 1 or middle bike frame 6, a plurality of mounting through holes 841 transversely extending through the coupling tube 84, and a plurality of screws 102; 64 respectively inserted through the mounting through holes 841 and the rear end of the front bike frame 1 or middle bike frame 6, and a plurality of nuts 103; 65 respectively threaded onto the screws 102; 64 to secure the front end of the rear bike frame 8 to the rear end of the front bike frame 1 or middle bike frame 6. The rear bike frame 8 further comprises an upright support 85 (see FIG. 17), an elevation adjustment structure F mounted at the upright support 85, two rear saddle support bars 86 coupled to the upright support 85 and adjustable to the desired elevation by means of the elevation adjustment structure F, a support plate 851 (see FIG. 17 and FIG. 28) arranged at the top side of the upright support 85, two locating bolts 87 mounted at the support plate 851 and respectively coupled to respective coupling portions 861 of the front saddle support bars 86, two connection plates 89 respectively pivotally connected to the rear transverse frames 9 by respective pivot members 892, and two gears 801; 802 pivotally mounted at a bottom side thereof and meshed together (see FIG. 18 and FIG. 19). Each locating bolt 87 has a polygonal head 871 positioned in a respective polygonal hole 8511 at the support plate 851 (see FIG. 28) and a cylindrical shank 872 downwardly inserted through a respective hole 8611 at the coupling portion 861 of the associating rear saddle support bar 86. Thus, the locating bolts 87 prohibit the rear saddle support bars 86 from biasing. When the locating bolts 87 are lifted to disengage the respective polygonal heads 871 from the respective polygonal holes 8611 at the support plate 86, the rear saddle support bars 86 can be biased to a collapsed position.

The two rear transverse frames 9 each comprise a front frame bar 91 and a rear frame bar 92 (see FIG. 17), the front frame bar 91 and the rear frame bar 92 each having a first pivot portion 911; 921 respectively disposed at an inner end thereof and respectively pivotally connected to the pivot member 892 of the rear bike frame 8 and a second pivot portion 912; 922 respectively disposed at an inner end thereof, a front gear 941 and a rear gear 942 respectively pivotally mounted at the pivot members 892 of the rear bike frame 8 and meshed together and also meshed with the two gears 801; 802 of the rear bike frame 8 (see FIG. 18), two connection bars 95 having respective inner ends thereof respectively pivotally connected to the second pivot portions 912; 922 of the front frame bar 91 and rear frame bar 92 by respective pivot members 913; 914 and respective outer ends 955 thereof respectively pivotally connected to the two rear wheel brackets 90 by respective pivot members 956, and a retaining structure G for securing the front frame bar 91 and the rear frame bar 92 together. The retaining structure G comprises a first retaining member 910 provided at the first front frame bar 91, a second retaining member 920 provided at the rear frame bar 92, and a retaining hole 9201 located on one end of the second retaining member 920 and detachably fastened to the first retaining member 910 to secure the front frame bar 91 and the rear frame bar 92 together, prohibiting the front frame bar 91 and the rear frame bar 92 from biasing relative to each other.

The two rear wheel brackets 90 (see FIG. 17, FIG. 22 and FIG. 23) each comprise a connection plate 901, a plurality of coupling holes 9011 located on the connection plate 901, pivot members 956 respectively mounted in the coupling holes 9011 and pivotally connected to the front frame bar 91 and rear frame bar 92 of one of the two rear transverse frames 9, a wheel seat 903, and a rear wheel 900 pivotally supported on the wheel seat 903.

When pedaling the first pedal assembly 53 (see FIG. 3), the rotary driving force will be transmitted through the first driving wheel 52 to the first one-way transmission bevel gear 511 and the front transmission shaft 51 and then through the first clutch 512 and the second clutch 711 to the rear transmission shaft 71, and then through the fifth one-way transmission bevel gear 714 to the rear wheel transmission shaft 70 and the first rear bevel gear 761 to rotate the rear wheel 900. When pedaling the second pedal assembly 55, the rotary driving force will be transmitted through the second driving wheel 54 to the second one-way transmission bevel gear 513 and the front transmission shaft 51 and then through the first clutch 512 of the front transmission shaft 51 and the second clutch 711 to the rear transmission shaft 71 to rotate the rear wheel transmission shaft 70. When pedaling the third pedal assembly 73, the rotary driving force will be transmitted through the third driving wheel 72 to the third one-way transmission bevel gear 712 and the rear transmission shaft 71 to rotate the rear wheel transmission shaft 70, enabling the second clutch 711 to rotate the first clutch 512 and the front transmission shaft 51. When pedaling the fourth pedal assembly 75, the rotary driving force will be transmitted through the fourth driving wheel 74 to the fourth one-way transmission bevel gear 713 and the rear transmission shaft 71 to rotate the rear wheel transmission shaft 70, enabling the second clutch 711 to rotate the first clutch 512 and the front transmission shaft 51. Further, for allowing two persons to ride the combination buddy bicycle in a side-by-side manner, detach the middle bike frame 6, and then connect the rear bike frame 8 to the front bike frame 1 (see FIG. 31). When going to collapse the rear bike frame 8 and the rear transverse frames 9, pull the second retaining member 920 of the retaining structure G to disengage the retaining hole 9201 from the first retaining member 910. Because the first shaft 76 and second shaft 77 of the rear wheel transmission shaft 70 are retractable (see FIGS. 24-27), they can be moved when the user collapses the rear bike frame 8 and the rear transverse frames 9.

Further, the rear transverse frames 9 are respectively equipped with respective pull ropes 991; 992 that are respectively fastened to the first shaft 76 and second shaft 77 of the rear wheel transmission shaft 70 (see FIG. 18), enabling the first shaft 76 and second shaft 77 of the rear wheel transmission shaft 70 to be moved by the rear transverse frames 9 during a collapsing operation.

In conclusion, the invention provides a combination buddy bicycle, which has the advantages and features as follows:

1. Except the function for riding by multiple persons, the rear bike frame can be directly connected to the front bike frame after removal of the middle bike frame, providing a mode for two persons to ride the bicycle in a side-by-side manner. Since the combination buddy bicycle can be selectively arranged into different forms for riding by multiple riders in a side-by-side or fore-and-aft manner, the invention widens the range of applications, enhances contribution to industrial value, and provides the advantages of convenience of use, selectivity and practicability.
2. The combination buddy bicycle is collapsible, saving storage size and facilitating packing and delivery.
3. When the steering control bars are biased, the connected front wheel brackets and front wheels are synchronously biased, assuring high stability.
4. The combination buddy bicycle eliminates chain transmission, avoiding loose chain or broken chain repair work, achieving synchronous steering and high stability, and prolonging bicycle lifespan.
5. The combination buddy bicycle has the characteristics of light weight and high mobility and less number of welded component parts, meeting the principles of environmental protection.
6. The motor is operable to drive the third rear bevel gear and the second rear bevel gear in rotating the rear wheel transmission shaft, providing an electric bike function.

While only few embodiment of the present invention have been shown and described, it will be understood that various modifications and changes could be made thereunto without departing from the spirit and scope of the invention disclosed.

What is claimed is:

1. A combination buddy bicycle, comprising a front bike frame, two transverse frames, two front wheel brackets, two steering control bars, two head tubes, a front transmission shaft, a first driving wheel, a first pedal assembly, a second driving wheel, a second pedal assembly, a middle bike frame, a rear transmission shaft, a third driving wheel, a third pedal assembly, a fourth driving wheel, a fourth pedal assembly, a rear transmission shaft, a rear bike frame, two rear transverse frames, and two rear wheel brackets, wherein:

said front bike frame comprises two connection portions bilaterally disposed at a front end thereof, two locating bolts respectively fastening the two connection portions to respective inner ends of two transverse frames, each locating bolt of said front bike frame comprising a polygonal head positioned in a respective polygonal hole in the associating connection portion and a cylindrical shank downwardly inserted through the associating transverse frame, two inner longitudinal links each having a front end respectively pivotally coupled to the cylindrical shanks of the locating bolts and a rear end, a middle transverse link pivotally coupled between rear ends of the two inner longitudinal links, two rear transverse links respectively pivotally connected with respective inner ends thereof to the rear ends of said two inner longitudinal links, two sector gears respectively fixedly located on the inner ends of said two rear transverse links and meshed with each other, two outer longitudinal links respectively pivotally coupled between respective outer ends of said two rear transverse links and respective outer ends of said two transverse frames, and a mounting structure for selectively connecting said middle bike frame or said rear bike frame to said front bike frame, the mounting structure of said front bike frame comprising a coupling hole located on a rear end of said front bike frame and adapted for receiving a front end of said middle bike frame or said rear bike frame, a plurality of mounting through holes transversely extending through said front bike frame in communication with the coupling hole, and a plurality of screws respectively inserted through the mounting through holes and the front end of said middle bike frame or said rear bike frame, and a plurality of nuts respectively threaded onto the screws to secure the front end of said middle bike frame or said rear bike frame to the rear end of said front bike frame;

said two transverse frames each comprise an inner connection portion, a locating hole vertically extending through the inner connection portion for the passing of one respective locating bolt of said front bike frame and having a polygonal top portion fitting the polygonal head of the respective locating bolt to prohibit the respective transverse frame from biasing relative to said front bike frame, an upper pivot lug and a lower pivot hole disposed at an outer end thereof at different elevations and respectively pivotally coupled to said two steering control bars and said two front wheel brackets, said upper pivot lug of each said transverse frame defining a bottom coupling hole and a backwardly tilted top coupling hole, and a steering universal joint having a first end thereof pivotally connected to the bottom coupling hole of said upper pivot lug and a second end thereof pivotally connected to the top coupling hole of said upper pivot lug;

said two front wheel brackets each comprise a coupling hole for the coupling of said steering control bars and said transverse frames, fastening elements transversely fastened thereto and extending across the coupling hole to lock said steering control bars, a wheel seat defining an axle hole, a front wheel axle, which has an inner end mounted in the axle hole and an outer end disposed outside the wheel seat, a front wheel pivotally supported on the outer end of said front wheel axle, and a fastening member fastened to the outer end of said front wheel axle to secure said front wheel in place;

said two steering control bars are respectively connected to said two front wheel brackets by fastening members, said two steering control bars having respective top ends thereof respectively pivotally coupled to the first ends of the steering universal joints at said transverse frames and respective bottom ends thereof respectively inserted through said transverse frames and said front wheel brackets and connected to respective front ends of said two outer longitudinal links by respective fastening members, said two outer longitudinal links having respectively rear ends thereof respectively pivotally connected to respective outer ends of said two rear transverse links by pivot connectors;

said two head tubes have respective bottom ends thereof respectively connected to the second ends of the steering universal joints at said two steering control bars and respective top ends thereof coupled with a respective retractable bar and a respective top handlebar;

said front transmission shaft is axially pivotally mounted in said middle bike frame, comprising a first one-way transmission bevel gear and a first clutch respectively fixedly mounted on opposing front and rear ends thereof and a second one-way transmission bevel gear fixedly mounted at a middle part thereof in a reversed direction relative to said first one-way transmission bevel gear;

said first driving wheel comprises a wheel axle pivotally mounted in said middle bike frame, and a bevel gear formed integral with the periphery thereof and meshed with said first one-way transmission bevel gear of said front transmission shaft;

said first pedal assembly comprises a pedal crank, two pedal pins respectively disposed at two distal ends of the pedal crank, two pedals respectively pivotally supported on the pedal pins, a connection rod connected to one pedal pin, and a connector connecting the connection rod to the wheel axle of said first driving wheel with a lock pin;

said second driving wheel comprises a wheel axle pivotally mounted in said middle bike frame, and a bevel gear formed integral with the periphery thereof and meshed with said second one-way transmission bevel gear of said front transmission shaft;

said second pedal assembly comprises a pedal crank, two pedal pins respectively disposed at two distal ends of the pedal crank, two pedals respectively pivotally supported on the pedal pins, a connection rod connected to one pedal pin, and a connector connecting the connection rod to the wheel axle of said second driving wheel with a lock pin;

said middle bike frame is pivotally coupled with said front transmission shaft to support said first driving wheel and said second driving wheel at two opposite lateral sides thereof and said first clutch of said front transmission shaft at a rear side thereof, said middle bike frame comprising a front mounting structure for connection to said front bike frame and a rear mounting structure for connection to said rear bike frame, said front mounting structure comprising a coupling tube for receiving the rear end of said front bike frame, a plurality of mounting through hole transversely extending through the coupling tube, and a plurality of screws respectively inserted through the mounting through holes and the rear end of said front bike frame, and a plurality of nuts respectively threaded onto the screws to secure the front end of said middle bike frame to the rear end of said front bike frame, said rear mounting structure comprises a coupling tube for receiving the front end of said rear bike frame, a plurality of mounting through holes transversely extending through the coupling tube, a plurality of screws respectively inserted through the mounting through holes and the rear end of the front bike frame, and a plurality of nuts respectively threaded onto the screws to secure the rear end of said middle bike frame to the front end of said rear bike frame, said middle bike frame further comprising an upright support, an elevation adjustment structure mounted at the upright support, two front saddle support bars coupled to the upright support and adjustable to the desired elevation by means of the elevation adjustment structure, two saddles respectively mounted at said front saddle support bars, two handlebar stems respectively mounted at said front saddle support bars, two handlebars respectively fastened to said handlebar stems, a support plate arranged at a top side of the upright support, two locating bolts mounted at the support plate and respectively coupled to respective coupling portions of said front saddle support bars, each locating bolt of said middle bike frame comprising a polygonal head positioned in a respective polygonal hole at the support plate and a cylindrical shank downwardly inserted through a respective hole at the coupling portion of the associating front saddle support bar;

said rear transmission shaft is axially pivotally mounted in said rear bike frame, comprising a second clutch disposed at a front end thereof and engageable with the first clutch of said front transmission shaft, a third one-way transmission bevel gear and a fourth one-way transmission bevel gear longitudinally spaced behind said second one-way transmission bevel gear in a reversed manner, and a fifth one-way transmission bevel gear disposed at a rear end thereof in a reversed direction relative to said fourth one-way transmission bevel gear;

said third driving wheel comprises a wheel axle pivotally mounted in said rear bike frame and extending out of one sidewall of said rear bike frame and then connected to said third pedal assembly, and a bevel gear formed integral with the periphery thereof and meshed with said third one-way transmission bevel gear of said rear transmission shaft;

said third pedal assembly comprises a pedal crank, two pedal pins respectively disposed at two distal ends of the pedal crank, two pedals respectively pivotally supported on the pedal pins, a connection rod connected to one pedal pin, and a connector connecting the connection rod to the wheel axle of said third driving wheel with a lock pin;

said fourth driving wheel comprises a wheel axle pivotally mounted in said rear bike frame and extending out of an opposite sidewall of said rear bike frame and then connected to said fourth pedal assembly, and a bevel gear formed integral with the periphery thereof and meshed with said fourth one-way transmission bevel gear of said rear transmission shaft;

said fourth pedal assembly comprises a pedal crank, two pedal pins respectively disposed at two distal ends of the pedal crank, two pedals respectively pivotally supported on the pedal pins, a connection rod connected to one pedal pin, and a connector connecting the connection rod to the wheel axle of said fourth driving wheel with a lock pin;

said rear wheel transmission shaft is transversely pivotally mounted in said rear bike frame, comprising a first shaft disposed at one side of one sidewall of said rear bike frame, and a second shaft disposed at one side of the opposite sidewall of said rear bike frame, said first shaft comprising a first rear bevel gear disposed at one end thereof and pivotally connected to one sidewall of said rear bike frame and meshed with said fifth one-way transmission bevel gear of said rear transmission shaft, a first universal joint coupled with one end thereof to an opposite end of said first shaft and with an opposite end thereof to one said rear wheel bracket, a second universal joint connected between said first shaft and said first bevel gear, a third universal joint connected between said first universal joint and said second universal joint, a polygonal block defining therein a hole for receiving one end of said second universal joint and a sliding slot, a polygonal hole formed in said first rear bevel gear for receiving the polygonal block, a fastening member mounted in the polygonal block to lock said second universal joint to the polygonal block, and a positioning member mounted in said first rear bevel gear and having one end thereof engaged into the sliding slot of the polygonal block to lock the polygonal block to said first rear bevel gear, a fourth universal joint disposed at an opposite end of said second shaft and connected with a distal end thereof to the other said rear wheel bracket, a fifth universal joint connected to said second rear bevel gear, a sixth universal joint connected between said fourth universal joint and said fifth universal joint, a polygonal block defining therein a hole for receiving one end of said fifth universal joint and a sliding slot, a polygonal hole formed in said second rear bevel gear for receiving the polygonal block, a fastening member mounted in the polygonal block to lock said second universal joint to the polygonal block, and a positioning member mounted in said second rear bevel gear and having one end thereof engaged into the sliding slot of the polygonal block to lock the polygonal block to said second rear bevel gear;

said rear bike frame is adapted to pivotally support said rear transmission shaft, said rear wheel transmission shaft, said third driving wheel and said fourth driving wheel, said rear bike frame comprising a front hole toward which said second clutch of said rear transmission shaft faces, and a bike frame mounting structure for connection to said front bike frame or said middle bike frame selectively, said bike frame mounting structure comprising a coupling tube surrounding the front hole of said rear bike frame for receiving the rear end of said front bike frame or said middle bike frame selectively, a plurality of mounting through holes transversely extending through the coupling tube, and a plurality of screws respectively inserted through the mounting through holes and the rear end of said front bike frame or said middle bike frame 6, and a plurality of nuts respectively threaded onto the screws to secure the front end of said rear bike frame to the rear end of said front bike frame or said middle bike frame, said rear bike frame further comprising an upright support, an elevation adjustment structure mounted at the upright support, two rear saddle support bars coupled to the upright support and adjustable to the desired elevation by means of the elevation adjustment structure, a support plate arranged at the top side of the upright support, two locating bolts mounted at the support plate and respectively coupled to respective coupling portions of said front saddle support bars, two connection plates respectively pivotally connected to said rear transverse frames by respective pivot members, and two gears pivotally mounted at a bottom side thereof and meshed together, each locating bolt of said rear bike frame comprising a polygonal head positioned in a respective polygonal hole at the support plate at said rear bike frame and a cylindrical shank downwardly inserted through a respective hole at the coupling portion of the associating rear saddle support bar;

said two rear transverse frames each comprise a front frame bar and a rear frame bar, said front frame bar and said rear frame bar each comprising a first pivot portion respectively disposed at an inner end thereof and respectively pivotally connected to the pivot member of said rear bike frame and a second pivot portion respectively disposed at an inner end thereof, a front gear and a rear gear respectively pivotally mounted at the pivot members of said rear bike frame and meshed together and also meshed with the two gears of said rear bike frame, two connection bars having respective inner ends thereof respectively pivotally connected to the second pivot portions of said front frame bar and said rear frame bar by respective pivot members and respective outer ends thereof respectively pivotally connected to said two rear wheel brackets by respective pivot members, and a retaining structure for securing said front frame bar and said rear frame bar together, said retaining structure comprising a first retaining member provided at said first front frame bar, a second retaining member provided at said rear frame bar, and a retaining hole located on one end of said second retaining member and detachably fastened to said first retaining member to secure said front frame bar and said rear frame bar together;

said two rear wheel brackets each comprise a connection plate, a plurality of coupling holes located on the connection plate, a plurality of pivot members respectively mounted in the coupling holes and pivotally connected to said front frame bar and said rear frame bar of one said rear transverse frame, a wheel seat, and a rear wheel pivotally supported on the wheel seat.

2. The combination buddy bicycle as claimed in claim 1, wherein said second shaft of said rear transmission shaft comprises a second rear bevel gear disposed at one end thereof and pivotally connected to the opposite sidewall of said rear bike frame, a third rear bevel gear meshed with said second rear bevel gear, and a motor having a motor shaft thereof connected with said third rear bevel gear.

3. The combination buddy bicycle as claimed in claim 1, wherein said rear transverse frames are respectively equipped with respective pull ropes that are respectively fastened to the first shaft and second shaft of said rear wheel transmission shaft.

* * * * *